(12) United States Patent
Takeuchi

(10) Patent No.: US 7,478,415 B1
(45) Date of Patent: Jan. 13, 2009

(54) DIGITAL BROADCAST RECEIVING SYSTEM

(75) Inventor: Koichi Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1624 days.

(21) Appl. No.: 09/633,778

(22) Filed: Aug. 7, 2000

(30) Foreign Application Priority Data

Feb. 1, 2000 (JP) .............................. P2000-023763

(51) Int. Cl.
*H04N 7/16* (2006.01)
*H04N 5/445* (2006.01)

(52) U.S. Cl. ........................... 725/42; 725/142

(58) Field of Classification Search ............... 725/39, 725/58, 54, 50, 134, 142
See application file for complete search history.

(56) References Cited

U.S. PATENT DOCUMENTS 5,909,257 A * 6/1999 Ohishi et al. ............... 348/726
6,016,348 A * 1/2000 Blatter et al. ............... 380/228
6,604,243 B1 * 8/2003 Freimann .................... 725/131

FOREIGN PATENT DOCUMENTS

JP        A9247603        9/1997

\* cited by examiner

*Primary Examiner*—Christopher Kelley
*Assistant Examiner*—James Sheleheda
(74) *Attorney, Agent, or Firm*—Birch, Stewart, Kolasch & Birch, LLP

(57) ABSTRACT

Provided is a digital broadcast receiving system which facilitates to extract and obtain the information necessary for program recording and reproduction. A packet filter (2) allows to pass a packet for transmitting the moving picture and voice data related to the program to be recorded, and a packet for transmitting a PSI table, but it does not allow to pass a PMT related to programs other than the program to be recorded. An information table generator (7) generates a PAT containing only the information on the program to be recorded. A new PSI table generated by the information table generator (7) is inputted to an information table substitution unit (3), by which a PSI table contained in the packet stream passing through the packet filter (2) is substituted for the new PSI table.

2 Claims, 18 Drawing Sheets

F/G. 13

| | | |
|---|---|---|
| PROGRAM 1 | RECORDING POSITION : 000000~ | program_number=0×0003 |
| | | V_PID=0×0031 |
| | | A_PID=0×0034 |
| | | PCR_PID=0×003A |
| | | |
| PROGRAM 2 | RECORDING POSITION : 100000~ | program_number=0×0001 |
| | | V_PID=0×0011 |
| | | A_PID=0×0014 |
| | | PCR_PID=0×001A |
| | RECORDING POSITION : 120000~ | program_number=0×0001 |
| | | V_PID=0×0021 |
| | | A_PID=0×0024 |
| | | PCR_PID=0×001A |
| ⋮ | | |

FIG. 14

| PROGRAM 1 | RECORDING POSITION: 000000~ | program_number=0×0003 | CA_system_id=0×0003 |
| | | V_PID=0×0031 | DECIPHERED=yes |
| | | A_PID=0×0034 | |
| | | PCR_PID=0×003A | |
| | | | |
| | RECORDING POSITION: 100000~ | program_number=0×0003 | CA_system_id=0×0000 |
| | | V_PID=0×0031 | DECIPHERED=yes |
| | | A_PID=0×0034 | |
| | | PCR_PID=0×003A | |
| | RECORDING POSITION: 120000~ | program_number=0×0003 | CA_system_id=0×0003 |
| | | V_PID=0×0031 | DECIPHERED=no |
| | | A_PID=0×0034 | |
| | | PCR_PID=0×003A | |
| | ⋮ | | |

FIG. 15

| PROGRAM 1 | RECORDING POSITION: 000000~ | program_number=0×0003 |
| | | V_PID=0×0031 |
| | | A_PID=0×0034 |
| | | PCR_PID=0×003A |
| | | |
| PROGRAM 2 | RECORDING POSITION: 100000~ | program_number=0×0001 |
| | | V_PID=0×0011 |
| | | A_PID=0×0014 |
| | | PCR_PID=0×001A |
| | RECORDING POSITION: 120000~ | program_number=0×0001 |
| | | V_PID=0×0021 |
| | | A_PID=0×0024 |
| | | PCR_PID=0×001A |

FIG. 16

| | | |
|---|---|---|
| PROGRAM 1 | RECORDING POSITION : 000000~ | program_number=0×0001 |
| | | V_PID=0×0011 |
| | | A_PID=0×0014 |
| | | PCR_PID=0×001A |
| PROGRAM 2 | RECORDING POSITION : 100000~ | program_number=0×0002 |
| | | V_PID=0×0021 |
| | | A_PID=0×0024 |
| | | PCR_PID=0×002A |
| | RECORDING POSITION : 120000~ | program_number=0×0002 |
| | | V_PID=0×0021 |
| | | A_PID=0×0024 |
| | | PCR_PID=0×002A |

| PROGRAM 1 | RECORDING POSITION: 000000~ | rating=0×00 |
|---|---|---|
| PROGRAM 2 | RECORDING POSITION: 100000~ | rating=0×0A |
|  | RECORDING POSITION: 120000~ |  |
| ⋮ | ⋮ |  |

FIG. 18

| program_number=0×0001 |
|---|
| V_PID=0×0011 |
| A_PID=0×0014 |
| PCR_PID=0×001A |

FIG. 19

| PROGRAM 1 | RECORDING POSITION: 000000~ | DETAILS: PROFESSIONAL BASEBALL 9/10-19:00-20:55 NHK YAKULT V. HIROSHIMA, COMMENTATOR: T.HIROOKA |
|---|---|---|
| PROGRAM 2 | RECORDING POSITION: 120000~ | DETAILS: MOVIE 9/12-22:00-23:59 BS-1 "MERRY CHRISTMAS IN BATTLEFIELD |
|  | RECORDING POSITION: 100000~ |  |
|  | ⋮ |  |

DIGITAL BROADCAST RECEIVING SYSTEM

BACKGROUND OF THE INVENTION

1. Field of the Invention

The present invention relates to a digital broadcast receiving system and, in particular, to a digital broadcast receiving system having a function of recording and reproducing a digital information.

2. Description of the Background Art

FIG. 22 is a block diagram showing, only in simplified form, the configuration of a conventional digital broadcast receiving system as disclosed in Japanese Patent Application Laid-Open No. 9-247603 (1997). Referring to FIG. 22, this digital broadcast receiving system comprises a receiver 102, monitor 104, and record and reproduction unit 103. The receiver 102 comprises a receive and demodulation section 111, packet filter 112, controller 123, information table extractor 114, information table replacement unit 124, record and reproduction information table generator 126, digital interface 122, circuit changing switch 117, demultiplexer 118, and AV decoder 119. The record and reproduction unit 103 comprises a digital interface 131, information table extractor 132, controller 140, deck 135, and buffer 136.

Operation of the conventional digital broadcast receiving system shown in FIG. 22 will be explained hereinafter. The receive and demodulation section 111 demodulates the received digital broadcast signals. The information table extractor 114 extracts, from the digital broadcast signals, an NIT (Network Information Table) that is the network related information table, a PAT (Program Association Table) that is the information table related to the program of each channel, namely the entire information of the sent program, a PMT (Program Mapping Table) that is the information on the packet configuration of each program, and an EIT (Event Information Table) that is the detailed information of each program. These tables are multiplexed and transmitted in the digital broadcast signals, according to MPEG-2 system.

The controller 123 creates, based on the extracted information table, the information on the received plural programs, to inform it to the user. From these programs, the user selects the program that it is desired to record, and its result is sent to the controller 123. Based on the information table, the controller 123 designates the packet related to the program to be recorded, and its result is sent to the packet filter 112. The packet filter 112 selects the designated packet and then outputs it via the information table replacement unit 124 to the digital interface 122. The controller 123 also extracts much information on the program recorded (e.g., the broadcast start day and time, program name, and information indicating the kind of each stream in the digital broadcast signals received), from the descriptors in the extracted PMT and NIT.

The record and reproduction information table generator 126 collects much information extracted by the controller 123, and generates a record and reproduction information table in a MPEG-2 transport packet format, and, in a table format having a predetermined MPEG-2 table ID. The information table replacement unit 124 replaces an NIT in the various information tables sent from the packet filter 112, with a record and reproduction information table. The information table replacement unit 124 also rewrites a PAT and a PMT so as to contain only the information on the program and packet selected by the packet filter 112. Digital television signals after being subjected to a packet selection and table rewriting are outputted via the digital interface 122 to the record and reproduction unit 103.

When the record and reproduction unit 103 receives the digital television signals from the digital interface 131, a record and reproduction information table is extracted by the information table extractor 132. The controller 140 acquires much information on the program from the extracted information table. The controller 140 also inputs digital television signals via the buffer 136 to the deck 135, and the deck 135 records the signals in a recording medium.

When the recorded program is reproduced, the record and reproduction unit 103 demodulates the reproduction signals read out of the recording medium by using the deck 135, and outputs it via the buffer 136 to the digital interface 131. When the receiver 102 receives the digital television signals from the digital interface 122, a record and reproduction information table is extracted by the information table extractor 114. The controller 123 acquires much information on the program, from the extracted information table. The controller 123 also switches the circuit changing switch 117 to the digital interface 122 side. Based on the extracted information, the controller 123 directs the demultiplexer 118 to perform a packet selection of the digital broadcast signals. According to the instruction from the controller 123, the demultiplexer 118 separates the digital broadcast signals and inputs it to the AV decoder 119. The AV decoder 119 decodes the data and reproduces it on the monitor 104.

In this digital broadcast receiving system, however, the NIT that is defined by MPEG standard is altered for use as a table in its own format. Therefore, if it is desired to output again the recorded information data to other external unit, which results in the output of a nonstandard stream. In the event that the external unit cannot process the information data of its own format, there is the problem that the program cannot be reproduced.

In addition, the information needed in program recording and reproduction and, in particular, the program array information on the digital broadcast signals to be sent, has any value in those which are defined on the sending side, and is scattered in a plurality of information tables. Therefore, in the program recording and reproduction, a time lag for information extraction occurs, and thus a time lag occurs between the issue of a reproduction start command and the reproduction of the program, thereby making it difficult to process the information data rapidly and from the beginning.

Furthermore, in order that the program can be watched and listened from an arbitrary point of time during its broadcast, as a program array information, the information containing the same contents is sent repetitively and redundantly. Thus, with the conventional digital broadcast receiving system, such redundant data is directly recorded in the record and reproduction unit, thereby wasting a limited recording capacity.

SUMMARY OF THE INVENTION

According to a first aspect of the present invention, a digital broadcast receiving system comprises: a receive and demodulation section by which a digital broadcast signal received from the exterior is demodulated and outputted as a packet stream; a packet filter that filters a predetermined packet in a plurality of packets composing the packet stream; a record and reproduction unit by which the packet stream passing through the packet filter is recorded, and the recorded packet stream is reproduced and outputted; an information table generator that generates, with respect to a first specific information table in various information tables contained in the packet stream, a new first specific information table containing information only on the program to be recorded in the record and reproduction unit; and an information table substitution unit by which the new first specific information table is substituted for an information table corresponding to the first specific information table contained in the packet stream transmitted, the information table substitution unit being disposed between the receive and demodulation section and the record and reproduction unit.

According to a second aspect, the digital broadcast receiving system of the first aspect is characterized in that the first specific information table is a PAT (Program Association Table).

According to a third aspect, the digital broadcast receiving system of the first aspect is characterized in that the packet filter filters, of a plurality of second specific information tables contained in the packet stream transmitted, an information table other than the second specific information table related to the program to be recorded.

According to a fourth aspect, the digital broadcast receiving system of the third aspect is characterized in that the second specific information table is a PMT (Program Mapping Table).

According to a fifth aspect, the digital broadcast receiving system of the fourth aspect is characterized in that the information table generator has a function with which a specific value is substituted for the PID value of a packet for transmitting a ES (Elementary Stream) described in the PMT, thereby to generate the PMT; the information table substitution unit has a function with which the specific value is substituted for the PID value of a packet for transmitting a ES contained in the packet stream transmitted; and the digital broadcast receiving system further comprising a recording section for retaining the specific value.

According to a sixth aspect, the digital broadcast receiving system of the first aspect is characterized in that in the information table generator, a new CAT (Conditional Access Table) containing the encrypted state of the digital broadcast signal is generated with respect to a CAT in the variety of information tables; and that in the information table substitution unit, the new CAT is substituted for a CAT contained in the packet stream transmitted.

According to a seventh aspect, the digital broadcast receiving system of the first aspect further comprises: an information table extractor that extracts at least one of an SDT (Service Description Table) and an EIT (Event Information Table) in the various information tables contained in the packet stream transmitted; and a recording section that records information contained in either or both of the SDT and the EIT to be extracted by the information table extractor, and wherein the packet filter filters, of the SDT and the EIT contained in the packet stream transmitted, one or both which is (are) extracted by the information table extractor.

According to an eighth aspect, the digital broadcast receiving system of the first aspect further comprises: a control section that controls the operation of receiving the digital broadcast signal; and an information table extractor by which, from the packet stream outputted from the receive and demodulation section, a specific SI (Service Information) table in the various information tables is extracted to inform its contents to the control section, and wherein the packet filter filters the specific SI table contained in the packet stream transmitted.

According to a ninth aspect, the digital broadcast receiving system of the first aspect further comprises a timer for controlling the transmission intervals of the various information tables, when the information table substitution unit performs substitution of the various information tables.

According to a tenth aspect, the digital broadcast receiving system of the ninth aspect is characterized in that the information table substitution unit performs substitution of the various information tables at the maximum allowable transmission intervals specified for each of the various information tables.

According to an eleventh aspect, a digital broadcast receiving system comprises: a receive and demodulation section by which a digital broadcast signal received from the exterior is demodulated and outputted as a packet stream; a packet filter that filters a predetermined packet in a plurality of packets composing the packet stream; and a record and reproduction unit by which the packet stream passing through the packet filter is recorded, and the recorded packet stream is reproduced and outputted. This system is characterized in that the packet filter filters, of the plurality of packets, packets other than a packet for transmitting the data related to the program to be recorded in the record and reproduction unit, and the digital broadcast receiving system further comprising a recording section for recording a program information index generated based on information contained in various information tables which are extracted from the packet stream outputted from the receive and demodulation section.

According to a twelfth aspect, the digital broadcast receiving system of the eleventh aspect further comprises: an information table generator that generates a new information table with respect to a specific information table in the various information tables filtered by the packet filter; and an information table insertion unit for inserting the new information table to the packet stream transmitted, disposed between the receive and demodulation section and the record and reproduction unit.

According to a thirteenth aspect, the digital broadcast receiving system of the twelfth aspect is characterized in that a specific value is substituted for the PID value of a packet transmitting a ES described in a PMT, in the program information index; and that the information table insertion unit has a function with which the specific value is substituted for the PID value of a packet transmitting a ES contained in the packet stream transmitted.

According to a fourteenth aspect, the digital broadcast receiving system of the eleventh aspect is characterized in that the program information index contains information described in at least one of an SDT and an EIT.

According to a fifteenth aspect, the digital broadcast receiving system of the fourteenth aspect is characterized in that the program information index further contains information described in a BAT (Bouquet Association Table).

According to a sixteenth aspect, a digital broadcast receiving system comprises: a receive and demodulation section by which a digital broadcast signal received from the exterior is demodulated and outputted as a packet stream; a packet filter that filters a predetermined packet in a plurality of packets composing the packet stream; a record and reproduction unit by which the packet stream passing through the packet filter is recorded, and the recorded packet stream is reproduced and outputted; an information table generator for generating a predetermined information table; an output information insertion unit by which the predetermined information table is inserted to the packet stream outputted from the record and reproduction unit, thereby to output it as a new packet stream; and a circuit changing switch that performs a selective switching between the packet stream outputted from the receive and demodulation section, and the new packet stream outputted from the output information insertion unit, thereby performing its transmission to a digital output section.

According to a seventeenth aspect, the digital broadcast receiving system of the sixteenth aspect is characterized in that the information table generator has a function with which the value of the program_number of the program recorded in the record and reproduction unit is subjected to an arbitrary alteration, to generate the predetermined information table; and that the output information insertion unit has a function with which the value obtained by the alteration to the program_number is provided to the packet stream transmitted.

According to an eighteenth aspect, the digital broadcast receiving system of the sixteenth aspect is characterized in that the information table generator has a function with which the PID value of a ES to be described is subjected to an arbitrary alteration, to generate the predetermined information table; and that the output information insertion unit has a function with which the value obtained by the alteration to the program_number is substituted for the PID value of a packet transmitting a ES contained in the packet stream transmitted.

According to a nineteenth aspect, the digital broadcast receiving system of the sixteenth aspect is characterized in that, when the new packet stream is transmitted from the output information insertion unit via the circuit changing switch to the digital output section, at least one of an SDT, EIT, BAT, PCAT (Partial Content Announcement Table), TDT (Time Data Table) and TOT (Time Offset Table) is multiplexed with the new packet stream, and then outputted.

With the first aspect, the new first specific information table containing the information only on the program to be recorded is substituted for the first specific information table. Therefore, the data quantity of the first specific information table is compressed, thereby to increase the efficiency of recording of the record and reproduction unit.

With the second aspect, the PAT related to the program to be recorded is recorded in the record and reproduction unit. As to the PAT, therefore, it is able to obtain a packet stream that conforms to MPEG standard.

With the third aspect, the second specific information table related to programs other than the program to be recorded is filtered by the packet filter. This enables to reduce the number of packets for transmitting the second specific information table, thereby increasing the efficiency of recording of the record and reproduction unit.

With the fourth aspect, the PMT related to the program to be recorded is recorded in the record and reproduction unit. As to the PMT, therefore, it is able to obtain a packet stream that conforms to MPEG standard.

With the fifth aspect, the PID value of the packet transmitting a ES is a known value retained in the recording section. Therefore, the reproduction system that performs the reproduction processing of packet streams outputted from the record and reproduction unit can immediately start the processing of the ES, without verifying the description contents of a PAT and a PMT.

With the sixth aspect, the CAT related to the program to be recorded is recorded in the record and reproduction unit. As to the CAT, therefore, it is able to obtain a packet stream that conforms to MPEG standard.

With the seventh aspect, it is able to utilize the information contained in an SDT and an EIT, while increasing the efficiency of recording of the record and reproduction unit.

With the eighth aspect, upon receipt of a digital broadcast signal, the control section can utilize the description contents of a SI table, while increasing the efficiency of recording of the record and reproduction unit.

With the ninth aspect, when various information tables are transmitted at intervals shorter than the maximum allowable transmission intervals defined by a given standard, the efficiency of recording of the record and reproduction unit can be further increased by extending the transmission intervals of information tables while monitoring the elapsed time by a timer.

With the tenth aspect, a maximum efficiency of recording of the record and reproduction unit is attained while conforming to a given standard.

With the eleventh aspect, the efficiency of recording of the record and reproduction unit can be far increased because only the packets for transmitting the data related to the program to be recorded are recorded in the record and reproduction unit.

With the twelfth aspect, a specific information table can be recorded in the record and reproduction unit. Therefore, if the record and reproduction unit has a portable recording medium, the reproduction of the program linked to accounting can be operated to the sending side's satisfaction, by recording a CAT in the recording medium.

With the thirteenth aspect, since the PID value of a packet transmitting a ES is a known value described in a program information index, the reproduction system that reproduces the packet stream outputted from the record and reproduction unit can immediately start the processing of the ES, without verifying the description contents of a PAT and a PMT.

With the fourteenth aspect, the user's convenience can be improved by describing an SDT and an EIT, each having high availability, in a program information index.

With the fifteenth aspect, the user's convenience can be improved by describing a BAT in a program information index.

With the sixteenth aspect, the program recorded in the record and reproduction unit can be watched and listened even in the external unit connected to the digital output section. In addition, by inserting a predetermined information table to the packet stream outputted from the record and reproduction unit, it can be outputted as a new packet stream that conforms to a given standard.

With the seventeenth aspect, when simultaneously outputting a plurality of programs having the same program_number recorded in the record and reproduction unit, the programs can be separated and processed by altering the program_number of one program.

With the eighteenth aspect, when simultaneously outputting a plurality of programs in which each ES stored in the record and reproduction unit has the same PID value, the programs can be separated and processed by altering the PID value of ES of one program.

With the nineteenth aspect, SDT, EIT, BAT, PCAT, TDT and TOT which are currently in transmission to the receive and demodulation section can be utilized in the external unit connected to the digital output section, thereby increasing the user's convenience.

It is an object of the present invention to provide a digital broadcast receiving system with which it is easy to extract and acquire the information necessary for program recording and reproduction, particularly, the program array information of a digital broadcast signal to be sent, and with which it is able to output to other external unit an information data that conforms to MPEG standard.

It is another object of the invention to provide a digital broadcast receiving system which permits a prolonged program recording and reproduction in such a manner that, of the digital broadcast signals to be sent, only a minimum information required for the program recording and reproduction is recorded for increasing efficiency of recording.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram illustrating a program information index stored in memory;

FIG. 14 is a diagram illustrating a program information index containing an encrypted state;

FIG. 15 is a diagram of a program array information created based on an information table when it is outputted from a receive and demodulation section;

FIG. 16 is a diagram of a program information index created based on an information table after being subjected to the substitution of the PID value of each ES;

FIG. 17 is a diagram of a program information index created by making the PID value of each ES the same;

FIG. 18 is a diagram of a system defining value;

FIG. 19 is a diagram illustrating a program information index;

DESCRIPTION OF THE PREFERRED EMBODIMENTS

Figure 1:
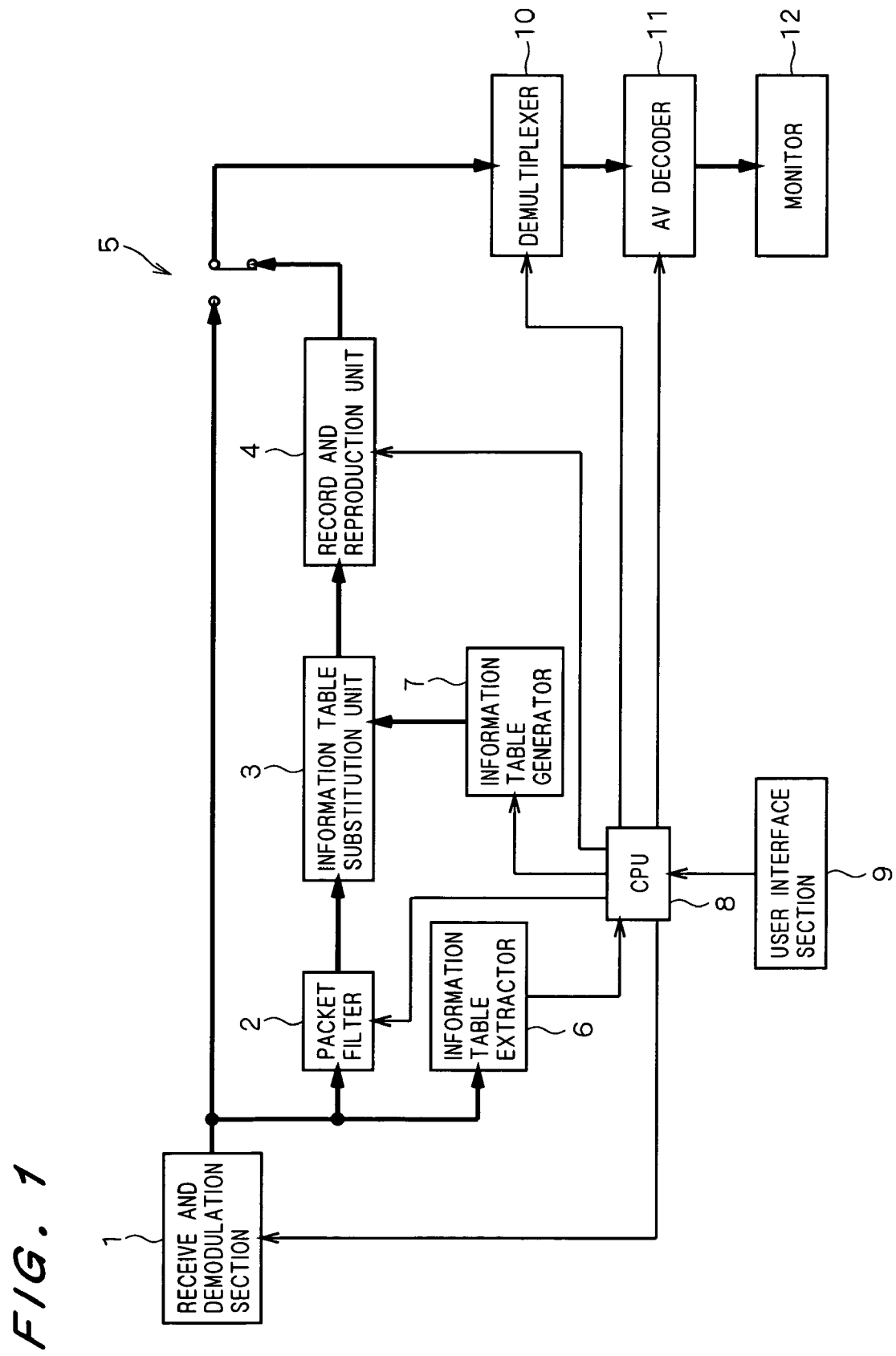
FIG. 1 is a block diagram illustrating the configuration of a digital broadcast receiving system according to a first preferred embodiment of the invention.

Preferred embodiments of a digital broadcast receiving system according to the present invention will be explained in detail by referring to the accompanying drawings. It should be noted that various descriptions and data names in the following explanation conform to STD-B10 (which is a program array information used in digital broadcast) standard, issued by ARIB (Association of Radio Industries and Businesses). In the drawings, bold lines indicate a digital information data flow, and ordinary lines indicate a data flow related to control signals and the control in the relationship of circuit connection to a CPU 8.

First Preferred Embodiment

FIG. 1 is a block diagram illustrating the configuration of a digital broadcast receiving system according to a first preferred embodiment of the invention. The output of a receive and demodulation section 1 is connected to the input of a packet filter 2, one input of a circuit changing switch 5, and the input of an information table extractor 6, respectively. The output of the packet filter 2 is connected to the input of the information table substitution unit 3. The output of the unit 3 is connected to the input of a record and reproduction unit 4. The output of the unit 4 is connected to the other input of the circuit changing switch 5. The output of the information table extractor 6 is connected to the input of a CPU 8 (control section). The output of the CPU 8 is connected to the respective inputs of the receive and demodulation section 1, the packet filter 2, an information table generator 7, the record and reproduction unit 4, a demultiplexer 10, and an AV decoder 11. The output of the information table generator 7 is connected to the input of the information table substitution unit 3. The output of the circuit changing switch 5 is connected to the input of the demultiplexer 10. The output of the demultiplexer 10 is connected to the input of the AV decoder 11. The output of the AV decoder 11 is connected to the input of a monitor 12. The output of a user interface section 9 is connected to the input of the CPU 8.

Operation of a digital broadcast receiving system of the first preferred embodiment will be explained hereinafter. The CPU 8 switches the circuit changing switch 5 to the receive and demodulation section 1 side. The receive and demodulation section 1 demodulates the received digital broadcast signal and outputs it in a packet stream format. The packet stream comprises a packet for transmitting an image data and voice data of programs (hereinafter referred to as "data transmission packet"), and a packet for transmitting various information tables (hereinafter referred to as "information table transmission packet"). In the demultiplexer 10 and AV decoder 11, a packet stream is processed according to the instruction from the CPU 8, and an Electric Program Guide (EPG) to be transmitted at that time is configured so as to be processable in the CPU 8. The EPG is then presented as a graphical information to be displayed on the monitor 12, alternatively, presented in the user interface section 9, to the user.

The user refers to the presented EPG, and selects an arbitrary program that it is desired to record from a plurality of programs. It is also possible to select the program to be recorded from not only the currently under-broadcasting programs but also from the programs which are scheduled for broadcast in the future. If it is desired to record the program scheduled for broadcast, the CPU 8 recognizes the current time for performing the following operations at its broadcast time.

Recording of programs will be explained hereinafter. Through the user interface section 9, the program to be recorded is designated by the user, and its result is sent to the CPU 8. The CPU 8 identifies the program to be recorded by using its broadcast time, and the value of a program_number which is one of the information contained in a program array information table.

At this time, the packet stream outputted from the receive and demodulation section 1 is inputted to the packet filter 2 and information table extractor 6, respectively. The information table extractor 6 extracts various information tables from the inputted packet stream, thereby to input these tables to the CPU 8. Based on the inputted information tables, the CPU 8 determines whether the program to be recorded is now in broadcast. Specifically, the CPU 8 is firstly referred to an event information section in an EIT, and reads the value of a program_number described therein, to identify the program. The CPU 8 then reads the value of a running_status that is one of the information contained in the EIT, to determine whether the program to be recorded is now actually transmitted. When the program designated by the user is one which is scheduled for broadcast in the future, the CPU 8 verifies whether the designated program will be transmitted as scheduled, based on the next event information contained in the EIT, prior to from several seconds to several minutes from the start time of the designated program. This enables to reliably record the program from the beginning, thereby preventing recording errors.

When the program to be recorded transmission is verified, the CPU 8 indicates the packet filter 2 the PID value of a packet to be passed. In the first preferred embodiment, the PID value indicated herein is the PID value of a packet that transmits the moving picture data related to the program to be recorded, the PID value of a packet that transmits the voice data related to the program to be recorded, the PID value of a packet for transmitting other program related information according to the instruction, and the PID value of a packet for transmitting a PSI table. As to the packet to be determined that no recording is needed therefor (e.g., null packet), this packet is not required to pass the packet filter 2, and therefore, its PID value is not indicated by the CPU 8. If the recording capacity of a recording medium in the record and reproduction unit 4 is sufficiently large, an image data and the like, which are related to programs other than the program to be recorded, may be allowed to pass therethrough. With regard to the packet transmitting a moving picture data, if a plurality of moving picture packets are contained by means of a hierarchical transmission, this fact is described in a PMT. Therefore, the CPU 8 determines whether these moving pictures are to be recorded depending on the user's instruction.

Figure 2:
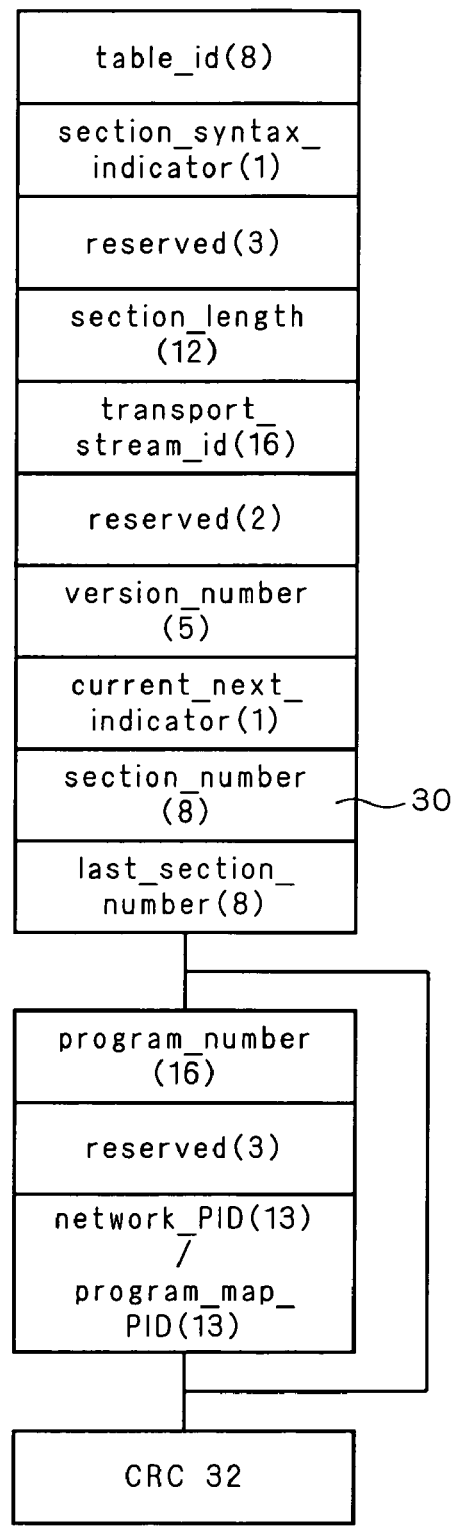
FIG. 2 is a diagram of a PAT when it is outputted from a receive and demodulation section.
Figure 3:
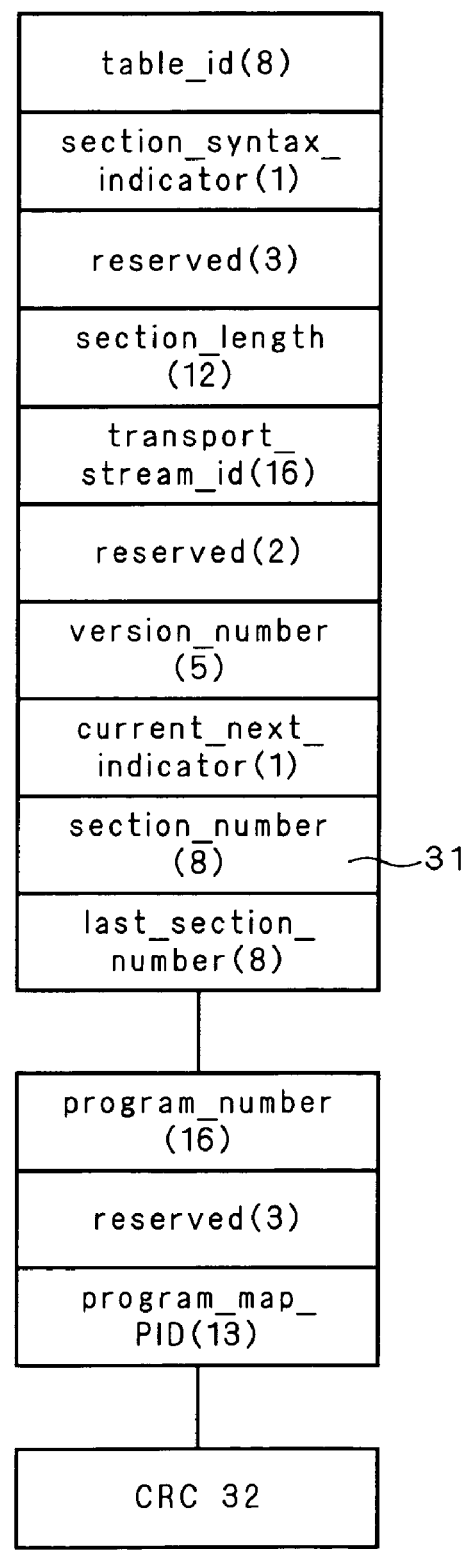
FIG. 3 is a diagram of a new PAT which is generated by an information table generator.

Due to the filtering operation of the packet filter 2, the absence of a packet occurs in a packet stream. As a result, the contents of the PSI table when it is outputted from the receive and demodulation section 1 has no consistency with a new packet stream after passing through the packet filter 2. Hence, the information table generator 7 generates a new PSI table corresponding to the new packet stream, according to the instruction from the CPU 8. FIG. 2 is a diagram of a PAT when it is outputted from the receive and demodulation section 1. FIG. 3 is a diagram of a new PAT generated by the information table generator 7. In FIG. 3, it is assumed that the number of programs to be recorded is one. As shown in FIG. 2, a descriptor related to a plurality of programs contained in a packet stream is repetitively described in the PAT when it is outputted from the receive and demodulation section 1. The number of the programs is described as section_number 30. In order to adapt to the new packet stream, there may be generated a PAT containing the information only about the program to be recorded. Therefore, the information table generator 7 deletes the descriptor related to programs other than the program to be recorded, and alters its section_number, thereby generating a new PAT. When only one program is recorded, section_number 31 described in the new PAT shown in FIG. 3, indicates "1".

Since the PMT related to programs other than the program to be recorded is distinguishable by its PID value, the PMT is filtered by the packet filter 2, according to the instruction from the CPU 8, and no succeeding transmission is performed.

Since an NIT itself is handled as optional processing in the MPEG standard, it is not always required to pass through the packet filter 2, transmit and record. Even when an NIT is filtered by the packet filter 2, it seems that the absence of the NIT exerts less influence on other units. However, it is preferred that the information table generator 7 generates a table having a program_number of "0" (i.e., an NIT), together with a recording program information, and the table is then inserted into a packet stream by the information table substitution unit 3. This permits response to a digital information processing system in which the presence of an NIT is essential.

A new PSI table generated by the information table generator 7 is inputted to the information table substitution unit 3. Then, a PSI table contained in the packet stream after passing through the packet filter 2 is substituted for the new PSI table. This substitution secures the consistency between the PSI table and the packet stream after passing through the packet filter 2. Further, since the data of a descriptor portion related to programs other than the program to be recorded is deleted in a new PAT after being subjected to substitution in the information table substitution unit 3, the total data quantity of the packet stream is compressed. Depending on the data quantity of the deleted descriptor portion, the number of packets itself is also reduced.

In a transport packet, a continuity_counter data which is increased by "1" per packet in a plurality of packets having the same PID value, is present. In the case of causing an absence of a packet as previously described, the continuity_counter value is also controlled by the information table generator 7, and a value suitable for each packet is added.

A new packet stream generated in this manner is sent to the record and reproduction unit 4, and then recorded in a recording medium housed in the unit 4. The recorded program can be reproduced by providing, at the time of recording, an index region different from a region in which a stream is continuously recorded, and recording in this index region a information on the position in a recording medium in which the program is recorded. When the recording medium is a fixed disk unit or semiconductor memory, the index region can be provided at any location except for a continuous recording region in which the program data is recorded. When the recording medium is a tape medium, the index region can be provided at any location (e.g., the head of the tape), except for the continuous recording region, alternatively, at the inside of an electronic storage housed in a tape casing such as in a digital video cassette. Further, in the case of a tape medium, the random access performance of the tape can be increased in the following manner that the above-mentioned information on the position is repetitively recorded between program data, as a different format data, which is easily distinguishable from a transport packet for transmitting the program data.

The sequence of recording operation is executable without using a signal line connecting the receive and demodulation section 1, circuit changing switch 5 and demultiplexer 10. Therefore, the user can record the necessary program while watching and listening a program other than the program to be recorded. It should be noted that when a plurality of programs are processed via different channels, the receive and demodulation section 1 is required to process multiple streams via multiple transponders. In such a case, the receive and demodulation section 1 is required to have a function of receiving multiple channels, and a function of distributing multiple transport streams to the information table extractor 6 side and the demultiplexer 10 side.

Reproduction of the recorded program will be explained hereinafter. When a program is recorded according to the user's instruction, the CPU 8 updates a list of the recorded programs graphically displayed on a monitor 12, for example. This enables to accept the user's instruction for reproducing the recorded program.

Through the user interface section 9, the program to be reproduced is designated by the user, and its result is sent to the CPU 8. The CPU 8 starts reading of a desired program data from the recording medium in the record and reproduction unit 4, by referring to the information on the recording position of the program data which has been recorded in an index region. The CPU 8 also switches the circuit changing switch 5 to the record and reproduction unit 4 side. Thereby, the read reproduction stream is transmitted via the circuit changing switch 5 to the demultiplexer 10 and AV decoder 11. The CPU 8 controls the demultiplexer 10 and AV decoder 11, to display the reproduced program on the monitor 12.

A digital information that arrives at the demultiplexer 10 when the recorded program is reproduced contains a program information such as a PSI table, image and voice data, etc., however, does not contain other related information such as a EPG. Consider now a response to the system which is set so as to process such a related information as well as a program information, upon receipt of the usual digital broadcast. In order to avoid that the absence of such a related information exerts adverse effect on the operations of the units, the CPU 8 controls to stop the processing of the related information other than the program information, in the course of the reproduction of the recorded program. As to the information that is to be monitored during the program reproduction, such as an emergency alert, its processing is performed all the time by the information table extractor 6 and, when necessary, it is able to move to a predetermined processing by sending an interruption request to the CPU 8.

Thus, in the digital broadcast receiving system according to the first preferred embodiment, by the presence of the substitution unit for PSI table, only a desired program can be recorded in the record and reproduction unit while satisfying MPEG standard. This enables to increase the efficiency of recording of the record and reproduction unit 4.

The foregoing explanation is directed to the recording and reproduction of broadcast programs among the information transmitted by means of digital broadcast. There is also the case that an accessory information such as a static image, voice, program, is broadcasted in synchronization with the program. If the data size of such accessory information is large, there may be added a function with which it is determined by the user as to whether the accessory information should be recorded together with the program. In that event, the CPU 8 controls so that the packet filter 2 filters only the data not required to be recorded, and allows for the passage of the data of the program to be recorded and all other program related information including the above accessory information.

When a digital broadcast data is encrypted and transmitted, it is described that the broadcast data is encrypted, in a CAT (Conditional Access Table) serving as one of PSI tables. The CAT is an essential information table as defined in the MPEG standard. In order to take the format that conforms to a given standard, as an information steam, the CAT is required to be transmitted at predetermined transmission intervals or below.

Therefore, it is able to record as a digital information that conforms to a given standard, in the following manner that when a new information table is generated by the information table generator 7, the contents of the CAT is suitably altered depending on the encrypted or non-encrypted state of the stream.

In the digital broadcast receiving system shown in FIG. 1, when the encryption of a broadcast data is deciphered in the receive and demodulation section 1, upon receipt of the instruction from the CPU 8, the record and reproduction unit 4 records and reproduces the digital broadcast data after subjected to cryptanalysis. At the time of generating a new information table, the information table generator 7 receives the instruction from the CPU 8, to set a predetermined flag indicating the encrypted state in a CAT, into the state indicating that the encryption is already deciphered. By virtue of such processing of the information table generator 7, even when a CAT is a processing object, only a desired program can be recorded in the record and reproduction unit 4, while satisfying MPEG standard.

Second Preferred Embodiment

In the first preferred embodiment, the contents of the PAT and PMT related to a program to be recorded are recorded in the record and reproduction unit 4, without altering their respective contents sent from the packet filter 2. It is however possible to configure so that the contents of the PAT and PMT related to the program to be recorded are also subjected to a specific operation.

Figure 4:
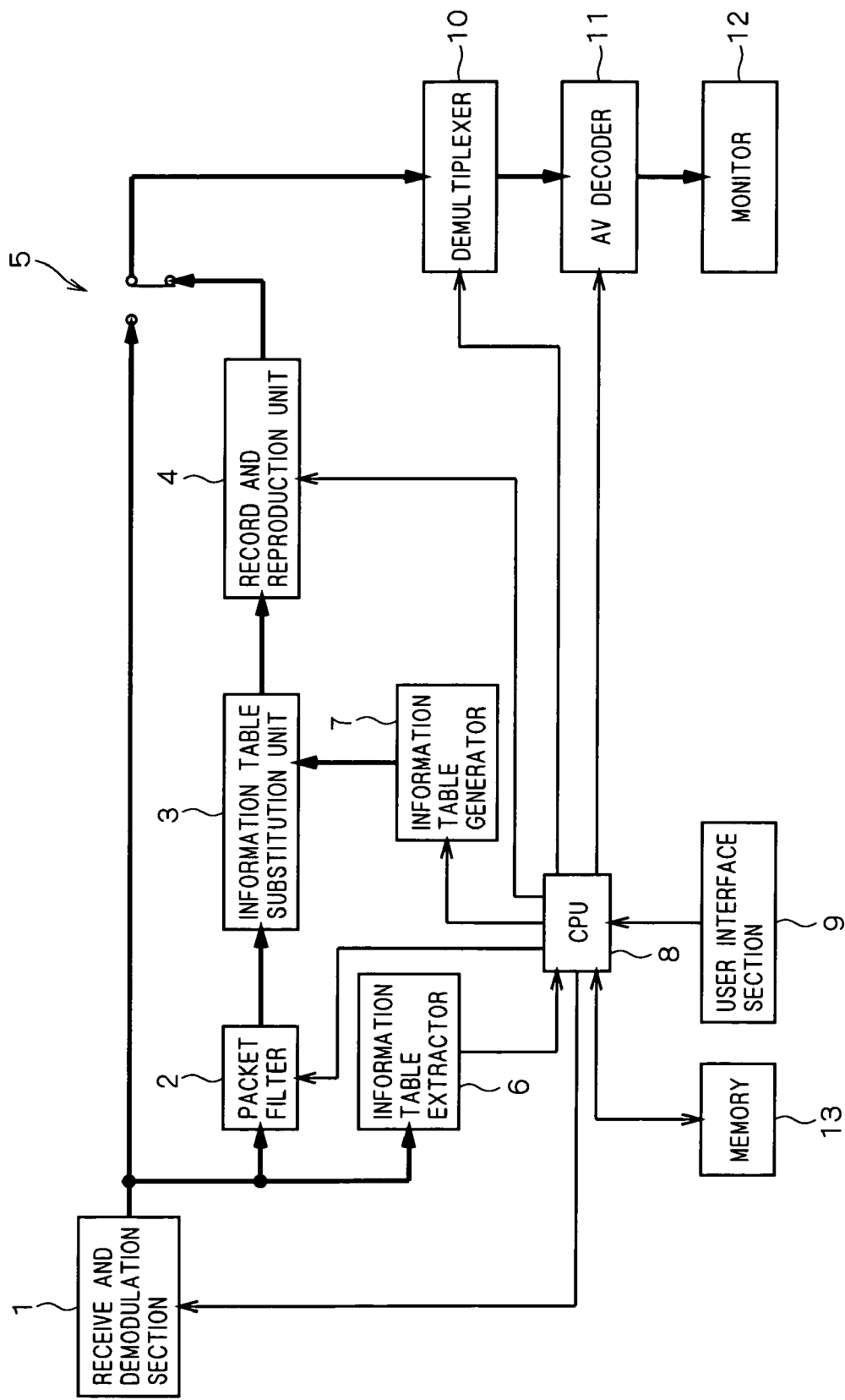
FIG. 4 is a block diagram illustrating the configuration of a digital broadcast receiving system according to a second preferred embodiment.

FIG. 4 is a block diagram illustrating the configuration of a digital broadcast receiving system according to a second preferred embodiment. Referring to FIG. 4, this digital broadcast receiving system comprises adding to the digital broadcast receiving system according to the first preferred embodiment shown in FIG. 1, a recording section, such as memory 13, which is mutually connected to a CPU 8.

Operation of the digital broadcast receiving system according to the second preferred embodiment will be explained by showing differences from that of the first preferred embodiment. Also in the second preferred embodiment, a packet filter 2 filters the unnecessary packet according to the instruction from the CPU 8 and, due to the absence of the packet, a PSI table when it is outputted from a receive and demodulation section 1 is not consistent with a new packet stream after passing through the packet filter 2. Therefore, according to the instruction from the CPU 8, an information table generator 7 generates a PAT and a PMT, each corresponding to the new packet stream.

Figure 5:
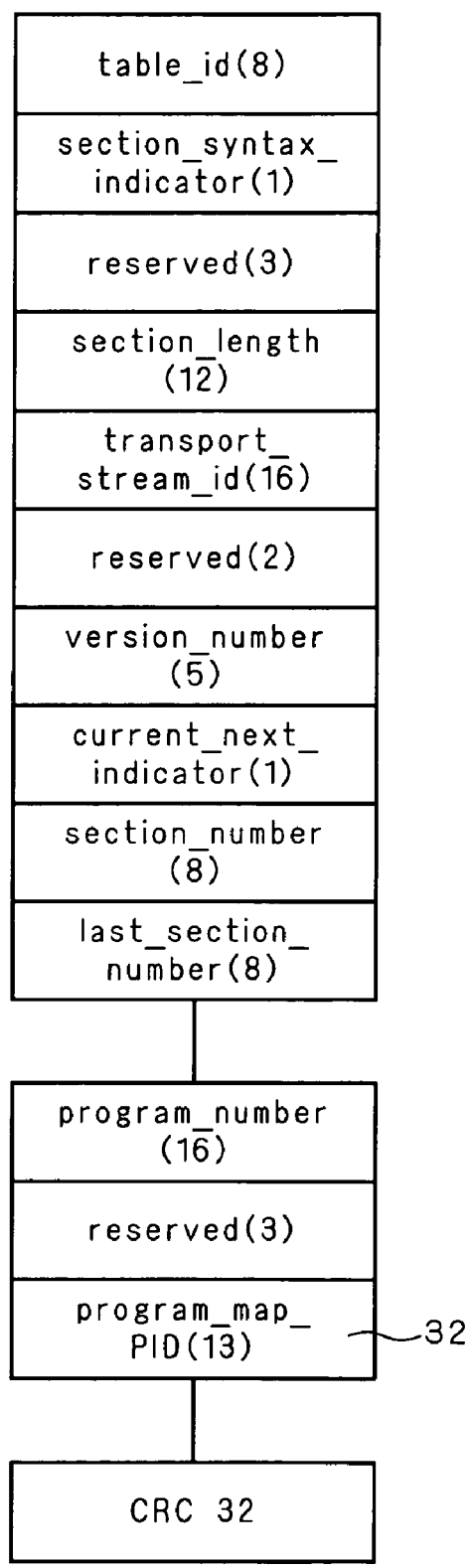
FIG. 5 is a diagram of a new PAT which is generated by an information table generator.
Figure 6:
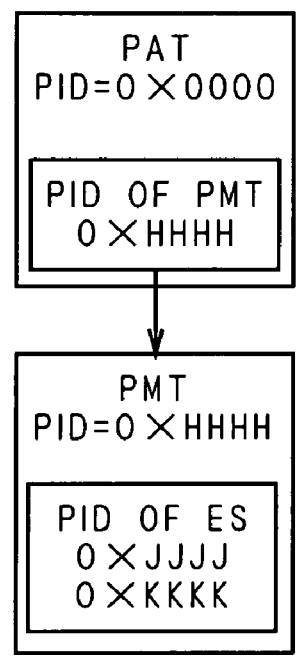
FIG. 6 is a diagram of the relationship between a PAT and a PMT, when these are outputted from a receive and demodulation section.
Figure 7:
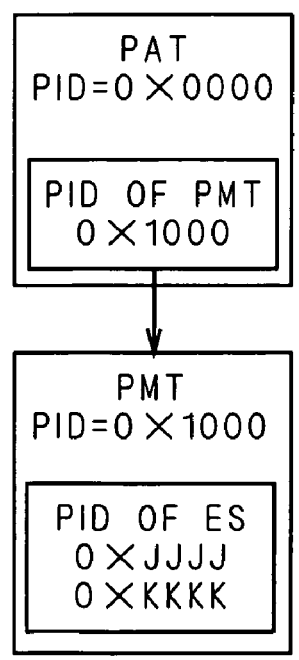
FIG. 7 is a diagram of the relationship between a new PAT and a new PMT, when these are generated by an information table generator.

FIG. 5 is a diagram illustrating a new PAT generated by the information table generator 7. FIG. 6 is a diagram of the relationship between a PAT and a PMT which are outputted from the receive and demodulation section 1. FIG. 7 is a diagram of the relationship between a new PAT and a new PMT which are generated by the information table generator 7. Hereat, it is assumed that the number of the programs to be recorded is one. As shown in FIG. 5, the information only about the program to be recorded is described in the new PAT, as in the first preferred embodiment. It should be noted that in the second preferred embodiment, a specific value is substituted for the PID value of the PMT 32 described in the PAT.

The second preferred embodiment is common to the first preferred embodiment in that the PMT related to programs other than the program to be recorded is filtered by the packet filter 2. However, in the second preferred embodiment, a PID value of a PMT (which means a PID data array identifying a packet for transmitting the PMT, and is described in from the 12-th byte to the 13-th byte in a transport packet) is altered to the above specific value which is already substituted in the PAT. The CPU 8 also stores the resulting PID value of the PMT, in the memory 13.

The new PAT and PMT generated by the information table generator 7 are inputted to an information table substitution unit 3, by which the new PAT and PMT are substituted for the PAT and PMT contained in the packet stream passing through the packet filter 2. The packet stream after subjected to this substitution is transmitted to and recorded in a record and reproduction unit 4. By performing this processing, a packet stream in which the PID value of a PMT is known can be recorded in the record and reproduction unit 4.

Reproduction of the recorded program will be explained hereinafter. With respect to the program selected by the user's instruction, the CPU 8 starts to read the program data from a recording medium housed in the record and reproduction unit 4. The CPU 8 also switches a circuit changing switch 5 to the record and reproduction unit 4 side, and transmits a reproduction stream to a demultiplexer 10. FIG. 7 shows the relationship between a PAT and a PMT when "0x1000" is substituted for both the PID value of the PMT described in the PAT, and the PID value of the PMT. Since the PID value of the PMT (0x1000) is a known value retained in the memory 13, a desired PMT can be processed without verifying the PID value of the PMT described in the PAT. In addition, since the PID value of the PMT is known, the demultiplexer 10 can directly decode the desired PMT, verify the PID value of each ES (Elementary Stream) described therein, and transmit these values to an AV decoder 11. Thereafter, the reproduced program is displayed on a monitor 12 in the same manner as in the first preferred embodiment.

Reproduction operation using ordinary PAT and PMT, as shown in FIG. 6, comprises receiving a PAT in which the PID value is fixed to "0X0000"; verifying the PID value of the PMT described in the PAT (i.e., "0xHHHH" in FIG. 6); receiving the PMT of the PID value; and verifying the PID value of each ES described in the PMT (i.e., "0XJJJJ" and "0XKKKK" in FIG. 6).

In the CPU 8, the position in a recording medium that records programs can be recognized for each program. Therefore, the PID value of the new PMT generated by the information table generator 7 can be made the same in the record and reproduction unit 4. By doing so, during the program recording, it is unnecessary to retain the PID value of a PMT in memory 13. Also, during the program reproduction, it is unnecessary to decode of a PAT and to verify the contents of its description, and subsequently to set the PID of the PMT and then wait arrival of a packet.

Figure 8:
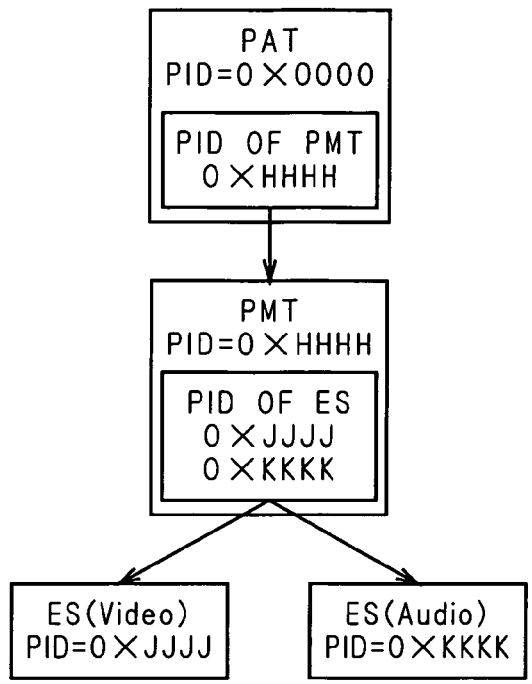
FIG. 8 is a diagram of the relationship between a PAT, a PMT, and each ES, when these are outputted from a receive and demodulation section.
Figure 9:
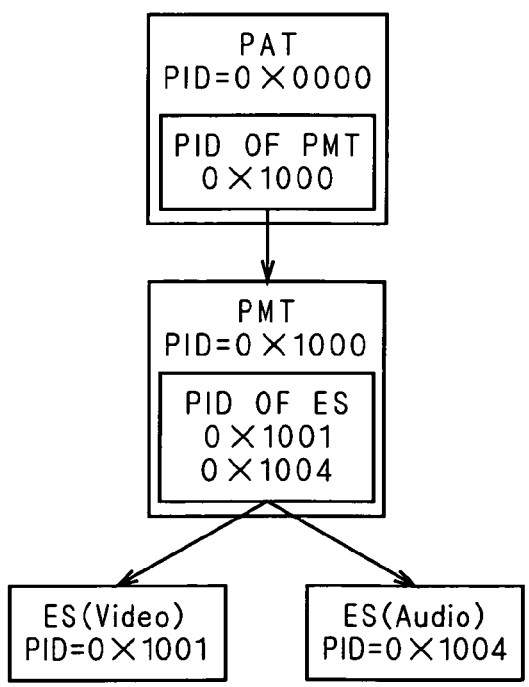
FIG. 9 is a diagram of the relationship between a PAT, a PMT, and each ES, after performing the substitution of the PID value of the ES.

Although in the foregoing, a specific value is substituted for the PID value of a PMT, in addition to this, it may be so constructed that a specific value is substituted for the PID value of a ES described in the PMT and the PID value of a ES. FIG. 8 is a diagram of the relationship between a PAT, a PMT and each ES, which are outputted from the receive and demodulation section 1. FIG. 9 is a diagram of the relationship between a PAT, PMT and each ES, after performing the substitution of the PID value of the ES. In FIG. 9, a specific first value ("0x1000" in FIG. 9) is substituted for the PID value of a PMT described in a PAT and the PID value of the PMT, and a specific second value ("0x1001" and "0x1004" in FIG. 9) is substituted for the PID value of each ES described in the PMT and the PID value of each ES, respectively.

This substitution of the PID value of each ES can be carried out by performing the substitution of the PID data array contained in a packet transmitting each ES by the information table substitution unit 3. In this case, the resulting PID value of each ES is retained in the memory 13. This enables to record, of the program array information, the program information stream having a known PID value of a ES that transmits the respective component information of the program.

In reproducing a recorded program in the system so configured, since the PID value of each ES composing the program is a known value retained in the memory 13, the demultiplexer 10 and AV decoder 11 can immediately start the processing of the ES, without verifying the description contents of a PAT and a PMT.

In the CPU 8, since the position in a recording medium that records programs can be recognized for each program, the new PID value of each ES generated by the information table generator 7 can be made the same per medium, such as of video or audio. By doing so, during the program recording, it is unnecessary to retain the PID value of each ES in memory 13. Also, during the program reproduction, it is unnecessary to verify the PID value of each ES retained in the memory 13.

Figure 10:
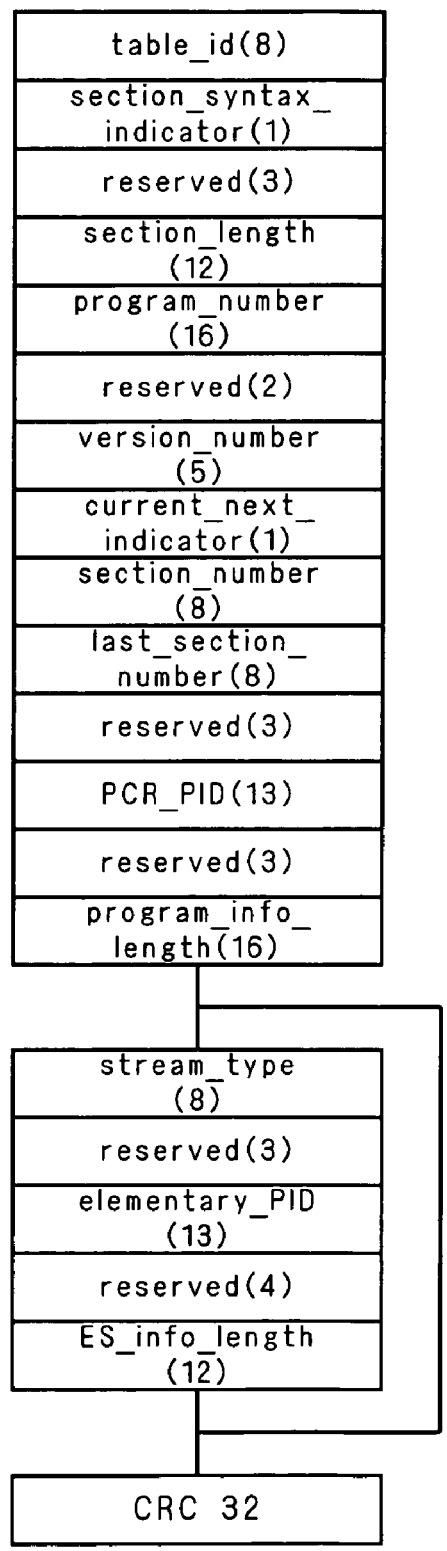
FIG. 10 is a diagram of other new PMT which is generated by an information table generator.

Alternatively, other PMT may be generated by the information table generator 7. FIG. 10 is a diagram illustrating other new PMT generated by the information table generator 7. The PMT shown in FIG. 10 is obtained by performing such a transformation that a PMT passing through the packet filter 2 is subjected to the alternation as previously mentioned, and the descriptor portion of the PMT is deleted.

In ARIB standard, there is the possibility that the information on the contents of a program, broadcast format and receiving standard is described in the descriptor portion of a PMT. However, upon receipt of the broadcast, when it is determined that the program can be watched and listened, and recorded, the reuse of the descriptor is not essential. It is considered that a descriptor is basically the information inherent in the entire program, and thus is less subject to a dynamic variation in the program. In spite of this, it is established that a PMT should be repetitively transmitted by setting its longest transmission intervals to 100 msec, depending on the given standard. As a result, a data array is repetitively transmitted, which is unnecessary from the point of view of program recording and reproduction. By recording such information at an arbitrary number of times of one or more, at any point of time in data recording, the program data can be received completely. Since the entire quantity of the data of descriptor portions does not exceed several K-bytes, it is able to record in other recording region in the system, such as the memory 13.

In view of the foregoing circumstances, the descriptor portion is deleted from the PMT, and the information on the deleted descriptor portion is recorded in a recording region except for a recording medium housed in the record and reproduction unit 4. This enables to increase the efficiency of recording of the recording medium in the record and reproduction unit 4, and also utilize the information on the descriptor portion when performing search and watching of the recorded program.

One of descriptors which are contained in a PMT and will be useful for the future reproduction, is a parental rate descriptor. This descriptor indicates the restriction of program watching and listening according to the age. By recording the contents of the descriptor related to the program to be recorded, it can be utilized as a guide, when children, etc. watch and listen the recorded program.

When the recording medium is a fixed disk device or semiconductor memory, a recording region for recording the information of a descriptor portion can be provided at any location except for a continuous recording region in which the program data is recorded. When the recording medium is a tape medium, a recording region can be provided at any location (e.g., the head of the tape), except for the continuous recording region, alternatively, at the inside of an electronic storage housed in a tape casing such as in a digital video cassette. In the case of a tape medium, the random access performance of the tape can be increased by repetitively recording the information of a descriptor between program data, as a different format data which is easily distinguishable from a transport packet for transmitting the program data.

Thus, with the digital broadcast receiving system of the second preferred embodiment, the following advantage is obtainable in addition to the effect resulting from the system of the first preferred embodiment. That is, there is no need to verify the description contents of a program array information table, which is required in the recorded program reproduction in the conventional system, thereby permitting fast processing of information data.

Third Preferred Embodiment

To the configuration of the first preferred embodiment, it is able to add such a configuration that a program related information table called "SI" (Service Information) is also processed. The information on the program currently in broadcast is described in two tables of an SDT (Service Description Table) and an EIT, respectively, which are contained in a digital information to be broadcasted. For instance, the SDT contains the broadcasting station of the program and its service name. The EIT contains detailed information such as people who appear in the program, and brief guide of the program, in addition to the program name and its broadcast time. Although such information does not directly affect the program recording and reproduction in the system and the performance of the system, if such information is recorded, it can be utilized when the recorded program is searched or watched in the future. This enables to increase convenience of the system to the user, and to increase efficiency of search and watching.

The configuration of the digital broadcast receiving system of the third preferred embodiment is the same as that of the second preferred embodiment. Operation of the system of the third preferred embodiment will be explained by showing differences from that of the first preferred embodiment.

Digital broadcast signals received and demodulated in a receive and demodulation section 1 is inputted to an information table extractor 6. In the extractor 6, a SI table is analyzed based on the instruction from a CPU 8, and the necessary data in its contents is inputted to the CPU 8. Each of SDT and EIT is provided with a table for the broadcast data transmitted via a transponder currently in receive, and a table for the broadcast data transmitted via other transponder. The EIT also has three tables of: the present and the next programs; programs within eight days; and programs from the eighth day on. The information table extractor 6 gives attention to a self-stream and the present program related information, and processes only the packet having the corresponding table ID. Of the present program related information, only the data related to the information indicated by the CPU 8 is extracted by the information table extractor 6. In this time, all the SDT and EIT contained in the packet stream outputted from the receive and demodulation section 1 are filtered by a packet filter 2.

The information from which the program name or the like are extracted is associated with the program data recorded in the record and reproduction unit 4, and recorded in the memory 13. As stated above, there is the possibility that the information on the program contents, broadcast format, receiving standard is contained in an SDT and an EIT. However, upon receipt of the broadcast, when it is determined that the program can be watched and listened, and recorded, the reuse of such information is not essential. It is considered that such information is less subject to a dynamic variation in the program. In addition, since their tables are repetitively transmitted, a data array which is unnecessary from the point of view of program recording and reproduction is repetitively transmitted. By recording such information at an arbitrary number of times of one or more, at any point of time in data recording, its data can be received completely. Such information is not always required to be recorded in the record and reproduction unit 4, it may be recorded in other recording region in the system, such as the memory 13.

This enables to increase the efficiency of recording of the recording medium housed in the record and reproduction unit 4. If the related information of the program name and the like is displayed on a monitor 12, this can assists the user's selection of the program reproduced.

When the portability of a recording medium of the record and reproduction unit 4 is taken into consideration, the program information described in an SDT and an EIT may be recorded in the recording medium. In this case, of the program information described in the SDT and EIT which are related to the respective programs extracted by an information table extractor 6, only the program information on the program to be recorded is inputted to an information table generator 7, according to the instruction from the CPU 8. The packet filter 2 receives the instruction from the CPU 8, to pass the SDT and EIT related to the program to be recorded. The information table generator 7 generates new SDT and EIT, based on the inputted program information. By an information table substitution unit 3, the SDT and EIT passing through the packet filter 2 are substituted for the new SDT and EIT.

Since the packets not required to be recorded, such as the packet for transmitting the data which is not related to the program to be recorded, is already filtered by the packet filter 2, the number of the packets composing a transport packet is reduced when they are sent to the record and reproduction unit 4. Therefore, the value of the continuity_counter of the transport packet is also controlled by the information table generator 7, and a suitable addition is made per packet. This processing enables to record a packet stream having consistency as a digital information. During reproduction, an SDT and an EIT can be processed in the same operation as in the processing of ordinary broadcast signals. This enables to simplify the software that controls the operation of the system.

Alternatively, it may be configured so that the processing is performed without filtering the entire or part of SDTs and EITs. In this case, the program information described in the SDT and EIT is extracted and retained by the information table extractor 4, and is processed so that the user can utilize the information. In this case, no operation related to the SDT and EIT is performed in the packet filter 2 and information table substitution unit 3, and all the packets related thereto are transmitted to and recorded in the record and reproduction unit 4. The time information and program table information at the time of recording is the past information at the time of reproduction. It is therefore considered that such information has low availability as it is. However, if it is desired to perform a simultaneous recording and reproduction in a short delay, it is possible to configure such a system with which a stream that conforms to a given standard is resent to an arbitrary unit, while increasing efficiency of recording.

Thus, in accordance with the digital broadcast receiving system of the third preferred embodiment, the following effect is obtainable in addition to the effect resulting from the system of the first preferred embodiment. That is, the user-friendly system can be configured through the processing of the data, such as an SDT and an EIT, inherent in digital broadcast signals.

Fourth Preferred Embodiment

The third preferred embodiment can be configured so as to process other SI tables. The information on the broadcast state of programs is described in each of the tables contained in the digital information to be broadcasted, such as an NIT, a BAT (Bouquet Association Table), a RST (Running Status Table), a TDT (Time Data Table), a TOT (Time Offset Table), a PCAT (Partial Content Announcement Table), and a ST (Stuffing Table). For instance, the information on transmission network is described in the NIT, the relevant information between multiple programs is described in the BAT, the information on the broadcast state of the program is described in the RST, the time information at the point of broadcast is described in the TDT and TOT, and the information on the broadcast circumstance of the data associated with the program is described in the PCAT. A ST is used when a significant data cannot be inserted in signal multiplexing. These table information is useful when the program is received, and watched and listened. However, after the program is already recorded, it is not always useful in reproducing the program.

The configuration of the digital broadcast receiving system of the fourth preferred embodiment is the same as that of the second preferred embodiment. Operation of the system of the fourth preferred embodiment will be explained by showing differences from that of the first preferred embodiment.

The digital broadcast signals received and demodulated in a receive and demodulation section 1 is inputted to an information table extractor 6. In the extractor 6, a SI table is analyzed based on the instruction from a CPU 8, and the necessary data in its contents is inputted to the CPU 8. For instance, the progress of the program to be recorded is described in a RST. In the event that the program is interrupted on the way, and then resumed, this is posted to the CPU 8. Since much related program information is described in a BAT, the system can be operated so as to record such information collectively. By using the table related to the time and the next program start time information in an EIT, the system can be operated so as to start recording reliably from the head of the program.

When the program receiving is possible, a packet filter 2 performs filtering so as not to pass these SI tables, according to the instruction from a CPU 8. This enables to increase the efficiency of recording of a record and reproduction unit 4. Other operations are the same as the first or third preferred embodiment.

It is, of course, possible to configure that the entire or part of these SI tables is processed without filtering them in the packet filter 2. In this case, no operation related to these SI tables is performed in the packet filter 2 and information table substitution unit 3, and all the packets related thereto are transmitted to and recorded in the record and reproduction unit 4. The time information and program table information at the time of recording is the past information at the time of reproduction. It is therefore considered that such information has low availability as it is. However, if it is desired to perform a simultaneous recording and reproduction in a short delay, it is able to configure such a system with which a stream that conforms to a given standard is resent to an arbitrary device, while increasing efficiency of recording.

Thus, in accordance with the digital broadcast receiving system of the fourth preferred embodiment, the following effect is obtainable in addition to the effect resulting from the system of the first preferred embodiment. That is, the user-friendly system can be configured through the processing of the data inherent in digital broadcast signals, such as SI information, e.g., a BAT and a RST.

Fifth Preferred Embodiment

The efficiency of recording in a record and reproduction unit 4 can further be increased by adding to the first preferred embodiment such a feature that the insertion interval is controlled when various tables are inserted in an information table substitution unit 3. Each data of the information tables contained in a digital broadcast data is repetitively transmitted, and the maximum allowable transmission intervals is defined for each table. For example, according to ARIB standard, it is established that a PAT and a PMT are to be transmitted at intervals of not more than 100 msec maximum, and an NIT and a BAT are to be transmitted at intervals of not more than 10 sec maximum. However, in the actual sending system configuration, transmission is usually carried out at shorter intervals than the aforesaid value and, from the point of view of recording programs, which can cause a reduction in the efficiency of recording. Hence, according to a fifth preferred embodiment, it is configured so as to permit the program recording by adjusting the transmission intervals of a variety of information tables.

Figure 11:
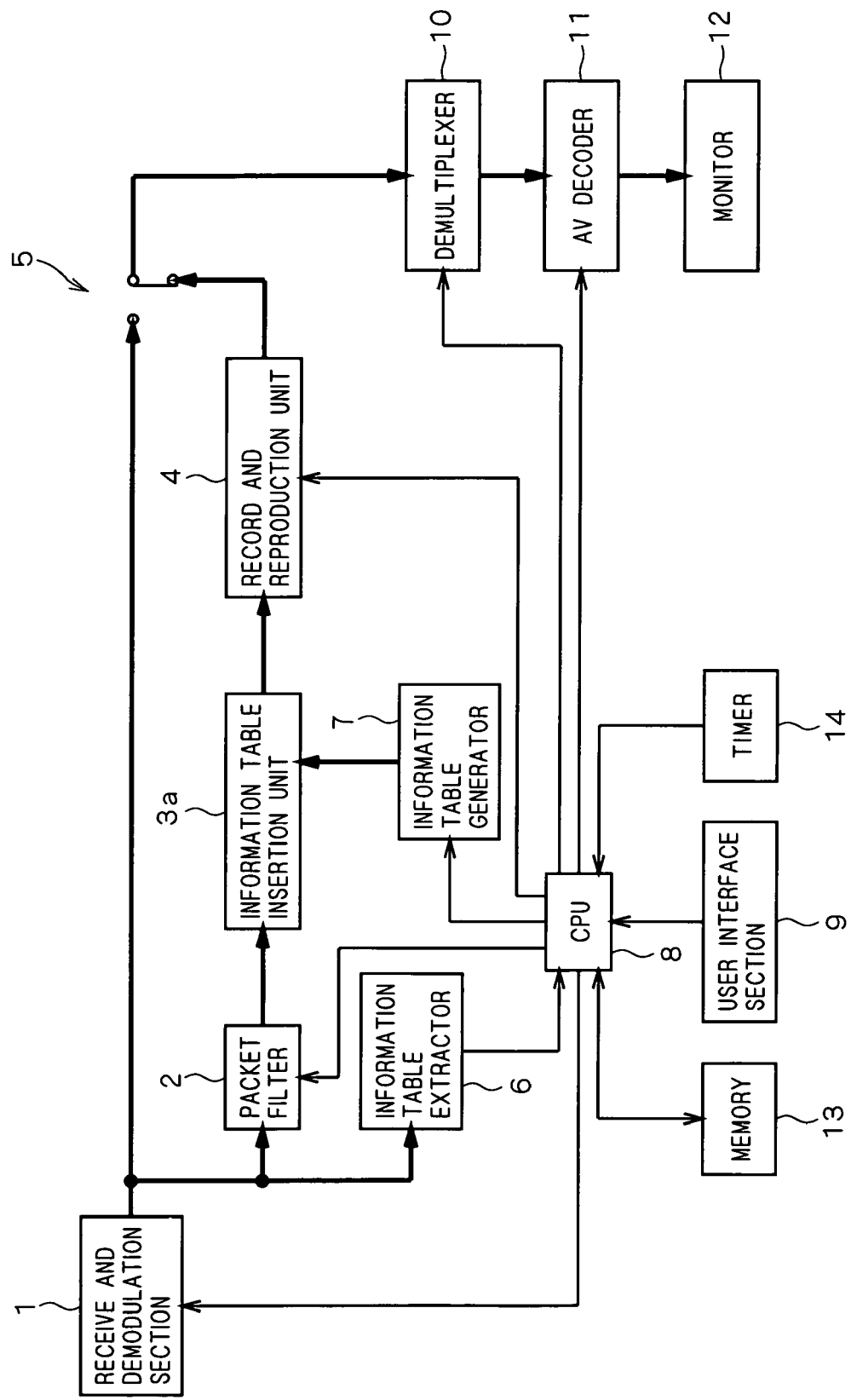
FIG. 11 is a block diagram illustrating the configuration of a digital broadcast receiving system according to a fifth preferred embodiment.

FIG. 11 is a block diagram illustrating the configuration of a digital broadcast receiving system according to the fifth preferred embodiment. As shown in FIG. 11, this system comprises disposing an information table insertion unit 3a instead of the information table substitution unit 3, and adding a timer 14 connected to a CPU 8, to the digital broadcast receiving system of the second preferred embodiment shown in FIG. 4.

Operation of the digital broadcast receiving system according to the fifth preferred embodiment will be explained by showing differences from that of the first preferred embodiment. In an information table extractor 6, a digital broadcast signal is inputted from a receive and demodulation section 1, and each information table is extracted individually and its extraction circumstance is inputted to the CPU 8. The CPU 8 monitors the arrival circumstance of each information table by using the timer 14 connected thereto (or a timer (not shown) housed in the CPU 8), in order to individually find the transmission intervals of each information table.

A packet filter 2 filters a variety of information tables which are the objects subjected to the transmission intervals adjustment, according to the instruction from the CPU 8. An information table generator 7 generates new information tables by retaining the contents of the information tables after subjected to the filtering in the packet filter 2, alternatively, by altering part or all the contents, in accordance with any of the foregoing preferred embodiments. The new information tables are inputted to the information table insertion unit 3a. The CPU 8 monitors the elapsed time by the timer 14, and sends an instruction of table insertion to the information table insertion unit 3a, in the range not exceeding transmission intervals specified for each table, depending on the given standard. According to the insertion instruction from the CPU 8, the information table insertion unit 3a inserts an information table to the packet stream sent from the packet filter 2. Herein, it is desirable to insert a variety of information tables at the maximum allowable transmission intervals, from the point of view of increasing efficiency of recording. It should be noted that in the packet stream to be inputted to the information table insertion unit 3a, a plurality of blanks are present which result from that a desired packet is deleted by the filtration in the packet filter 2. Therefore, it is desirable to insert an information table to the blanks, from the point of view of facilitating the information table insertion.

The transmission intervals of a variety of information tables can be set to an arbitrary value within the maximum allowable transmission intervals. For conforming to ARIB standard, the maximum allowable transmission intervals ranges from 30 sec to 100 msec, with respect to the information tables other than a RST, a ST and a PCAT. In the case of recording the stream that conforms only to MPEG standard, the maximum allowable transmission intervals is specified only for a PSI table. In this case, a new information table is inserted in the following transmission intervals: below 10 sec for NIT; below one sec for CAT; and below 100 msec for PAT or PMT.

Since the packets not required to be recorded, such as the packet for transmitting the data related to programs other than the program to be recorded, are already filtered by the packet filter 2, the number of the packets composing a transport packet is already reduced when they are sent to the record and reproduction unit 4. Therefore, the value of the continuity_counter of the transport packet is also controlled by the information table generator 7, and a suitable addition is made per packet. By virtue of this processing, only the minimum number of information tables can be transmitted to and recorded in the record and reproduction unit 4, thereby enabling to record the stream that conforms to a given standard, at high efficiency.

Alternatively, a further increase in the efficiency of recording is attainable by recording the stream that does not conform to a given standard in the record and reproduction unit 4. With the above mentioned configuration and operation, the transmission intervals of each information table can be set arbitrarily. Accordingly, the information table insertion unit 3a inserts an arbitrary information table to an arbitrary position in a packet stream, irrespective of the maximum allowable transmission intervals that is specified in a given standard. For instance, in the event that a variety of information tables are required at the time of starting a program reproduction, an information table is inserted to the head of a packet stream. In preparation for reproduction along with the random access to a recording medium, a PSI table is repetitively inserted, for example, approximately once for every 10 seconds. In this configuration, even when the reproduction is started from any position in the recorded program, a demultiplexer 10 can read the information from the PSI table within a maximum of 10 seconds, thereby starting the program reproduction. For the system which is configured so that the program reproduction is always started from the head of the recorded program, it will be sufficient if a variety of information tables are inserted only to the head of a packet stream.

As to SI tables, its information is not required in reproducing the recorded program, but is mainly utilized in presenting information to the user. Therefore, even if insertion is made at larger transmission intervals than that of the PSI table, the system operation is not seriously affected.

The program data generated in the above manner does not conform to a given standard. However, insofar as the system is configured so that the record and reproduction unit 4 itself or the recording medium of the record and reproduction unit 4 is used in a closed state in the system, there is no possibility that the program data is outputted to the exterior. Therefore, no particular problem will occur even if the program data does not conform to a given standard.

Thus, in accordance with the digital broadcast receiving system of the fifth preferred embodiment, the following effect is obtainable in addition to the effect resulting from the system of the first preferred embodiment. That is, digital broadcast signals can be recorded at higher efficiency of recording, by controlling the transmission intervals of a variety of information tables.

Sixth Preferred Embodiment

The first to fifth preferred embodiments are mainly configured so as to record the digital broadcast signals that conform to MPEG standard in the record and reproduction unit 4. However, insofar as the system is configured so that the record and reproduction unit 4 itself or the recording medium of the record and reproduction unit 4 is used in a closed state in the system, there is no possibility that the program data is outputted to the exterior. Therefore, no particular problem will occur even if the program data does not conform to a given standard. Such a configuration permits higher efficiency of recording in the record and reproduction unit 4.

Figure 12:
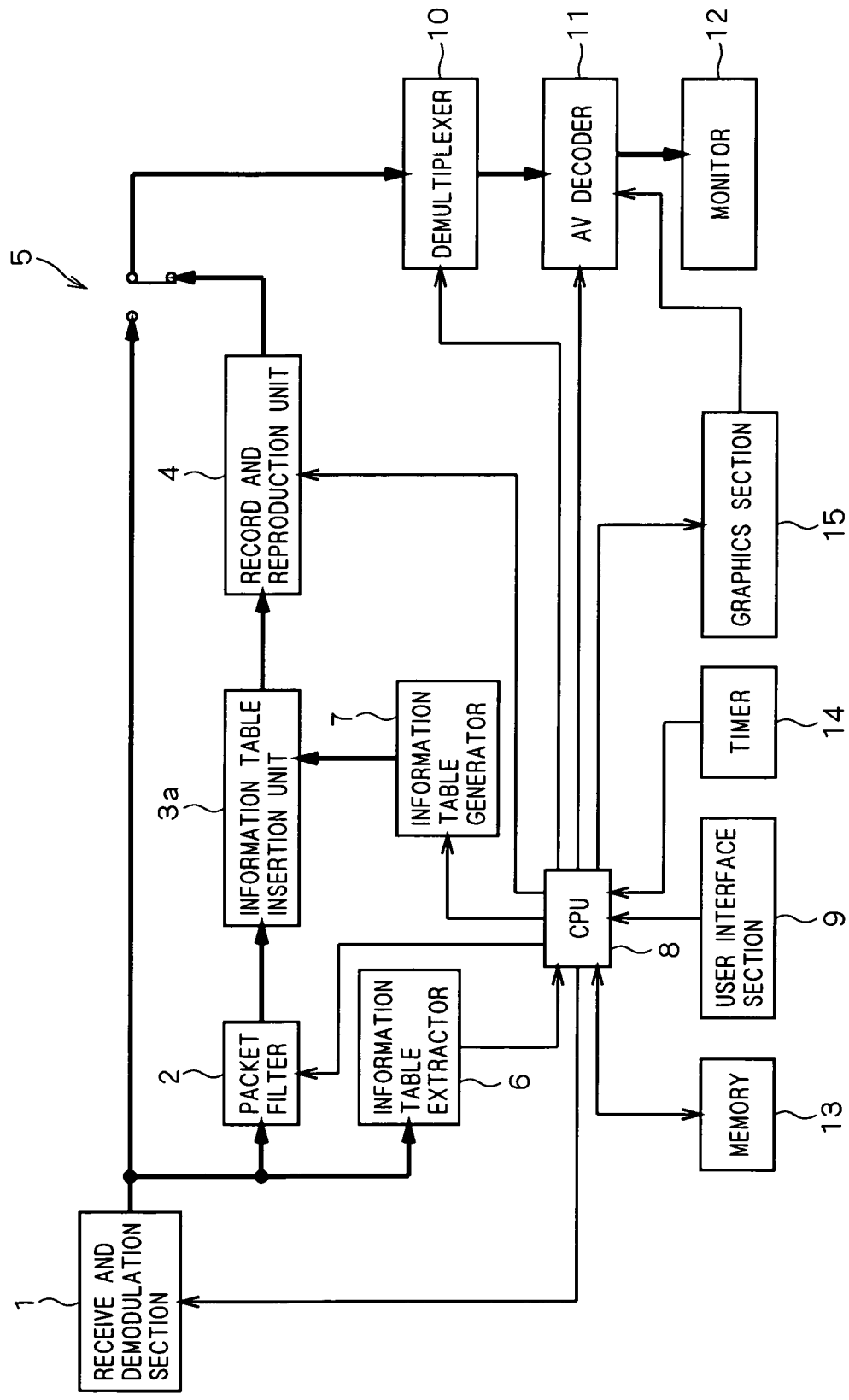
FIG. 12 is a block diagram illustrating the configuration of a digital broadcast receiving system according to a sixth preferred embodiment.

FIG. 12 is a block diagram illustrating the configuration of a digital broadcast receiving system according to a sixth preferred embodiment. As shown in FIG. 12, this system comprises adding, to the digital broadcast receiving system of the fifth preferred embodiment shown in FIG. 11, a graphics section 15 which has an input connected to a CPU 8, and an output connected to an AV decoder 11. Operation of the digital broadcast receiving system according to the sixth preferred embodiment will be explained by showing differences from that of the first preferred embodiment.

In an information table extractor 6, a digital broadcast signal is inputted from a receive and demodulation section 1, and a variety of information tables are extracted and inputted to a CPU 8. In the CPU 8, the inputted information tables are analyzed to read various data related to the program to be recorded. The CPU 8 creates a program information index based on the read various data, and records the index in memory 13. A variety of data described in the program information index are used, as required, in the subsequent operations.

According to the instruction from the CPU 8, a packet filter 2 allows for the passage of only the transport packet that transmits the moving picture data and voice data of the program to be recorded, and does not allow for the passage of other packets. However, when a PCR (program clock reference) that transmits the time information on the respective frames of the program to be recorded is described in an adaptation field of packets other than the packet transmitting the moving picture data and voice data, the packet for transmitting the PCR is also allowed to pass through the packet filter 2.

Based on the data inputted from the CPU 8, an information table generator 7 generates a new information table related to the program to be recorded by retaining the contents of the information table after subjected to filtering in the packet filter 2, alternatively, by altering part or all the contents, based on any of the foregoing embodiments.

An information table insertion unit 3a receives the output of the information table generator 7, and inserts an information table to the packet stream passing through the packet filter 2, according to the instruction from the CPU 8. At this time, the CPU 8 adjusts the transmission intervals of the information table, as in the fifth preferred embodiment. The frequency of insertion for various information tables is judged by the CPU 8, based on the recording capacity of each table by which it is allowed to occupy the record and reproduction unit 4. For instance, if it is desired to record a 100% moving picture and voice data alone in the record and reproduction unit 4, no information table is inserted by the information table insertion unit 3a. On the other hand, if the efficiency of recording in the record and reproduction unit 4 is not regarded as so important, a variety of tables can be inserted at the same timing as a digital broadcast signal when it is outputted from the receive and demodulation unit 1. The frequency of insertion is controlled in the following manner that the CPU 8 monitors the insertion timing for each table by using a timer 14 (or a timer (not shown) housed in the CPU 8). Based on the data size of each information table, and the recording capacity allowed for the information table, the CPU 8 issues an instruction of information table insertion to the information table insertion unit 3a.

The CPU 8 also chronologically monitors the residual capacity of a buffer memory (not shown) housed in the information table insertion unit 3a, and controls the information table insertion unit 3a to avoid that, when inserting a new information table, the capacity of the buffer memory is not exceeded by storing the moving picture and voice data. At the time of inserting an information table, not only the continuous_counter of a transport packet is to be given appropriately, but also the PID value is to be designated suitably.

The output of the information table insertion unit 3a is inputted to the record and reproduction unit 4, and then recorded in a recording medium. To the CPU 8, a graphics section 15 is connected and, by sending its output to an AV decoder 11, the necessary graphic display can be presented to the user, together with the moving picture image to be displayed on a monitor 12.

Reproduction of the recorded program will be explained hereinafter. In the sixth preferred embodiment, various information data needed in the program reproduction is read from a program information index which is recorded in the memory 13 at the time of the program recording, not the record and reproduction unit 4. Examples of the various information data necessary for reproduction are the position in a recorded medium that records the program, the moving picture data and voice data of the program, and the PID value of each packet for transmitting a PCR.

FIG. 13 is a diagram illustrating an example of a program information index recorded in memory 13. That is, FIG. 13 shows the program information index containing the information about two programs. After reading the information on the program to be reproduced from the program information index, the CPU 8 directs the record and reproduction unit 4 to start reading of the stream of the program to be reproduced, and sets the PID value read from the program information index to the demultiplexer 10 for starting the processing of their packets. By performing this processing, there is no need to carry out a two-step operation in which various parameters in a stream are firstly read, and the actual moving picture and voice is then decoded. The stream processed by the demultiplexer 10 is further processed by the AV decoder 11, and displayed on the monitor 12.

In this configuration, even when various information data is altered in the course of the program, the operation can be continued. In a digital information, for example, a PAT and a PMT are to be transmitted on a cycle of 100 msec maximum in MPEG standard. That is, there is the possibility that the information contents (e.g., the PID value) is altered on a cycle of 100 msec in the course of the program. With respect to such information, by recording, as a table, multiple information data in which the recording position of a single program is made into a parameter, as shown in FIG. 13, the reproduction using a new information data can be continuously performed from that recording position.

The above program information index may be recorded, besides the memory 13, in a specialized recording region in a replaceable medium, such as an electronic storage housed in a tape casing of a digital video cassette or the like. In such a case, a variety of parameters necessary for reproduction are to be described in the medium itself. Therefore, it is free from the disadvantage that can be caused when recording a program information index in the memory 13, namely, that a program reproduction is executable only in the system with which the program is recorded. However, with the system in which a digital information processing on the assumption of encryption is taken into consideration, the program can be reproduced only with the system that is allowed legitimately to decipher the encryption, by recording a program information index in the interior of the system, e.g., the memory 13, as stated earlier. Thereby, the reproduction of the program linked to accounting, such as pay-per-view, can be operated to the sending side's satisfaction.

When a digital broadcast data is encrypted and transmitted, a CAT describes that the data is encrypted. It is specified in MPEG standard that the maximum allowable transmission intervals of this CAT is one sec. There is the possibility that the encrypted state differs in each program. In the system of the sixth preferred embodiment, this encryption is deciphered by the receive and demodulation section 1, according to the instruction from the CPU 8. In the program recording, the state of encipherment at the point of time it is described in the CAT, is added to a program information index. FIG. 14 is a diagram illustrating a program information index containing the state of encipherment. In the program information index of FIG. 14, a CA system identification descriptor varies depending on the recording position. In this example, the programs recorded at the recording positions from 100000 to 11ffff are not enciphered, and these programs can be reproduced without authentication.

As to the programs corresponding to the enciphered portions, their reproduction is continued if the user is verified as one authorized to watch and listen the program. In the event that the user could not be authorized or failed to be authorized, the following operation seems to be performed. If the user is not allowed to watch and listen the program, according to the instruction of the CPU 8, the AV decoder 11 stops decoding, so that it is impossible to reproduce the program. In addition to this operation, alternatively, separately from this operation, it is able to provide information to the user, by taking the following steps. Specifically, a screen image indicating that authentication is necessary for watching and listening the program, is generated in the graphics section 15, according to the instruction from the CPU 8, and the screen image is mixed with the reproduction image of the moving picture by the AV decoder 11, thereby displaying the resulting image on the monitor 12.

Separately from the above operation, if the user is not allowed to watch and listen the program, it may be configured so that image is displayed intermittently by repeating the decoding of a moving picture and the decode halt at predetermined intervals in the AV decoder 11. In this case, the user cannot watch a complete reproduction image, it is therefore easy to motivate the user to obtain authentication for watching and listening, such as accounting. It is, of course, possible to facilitate the user's understanding in the following manner that a screen image indicating that it is the message from a CA is generated in the graphics section 15, and the screen image is displayed on the monitor 12.

In the foregoing explanation, the digital broadcast data of which encryption has been deciphered by the receive and demodulation section 1 is transmitted to and recorded in the record and reproduction unit 4. If a recording medium of the record and reproduction unit 4 has portability, however, in some cases it is desirable to perform recording without deciphering part or all the encryption, taking into consideration the event that authentication for cryptanalysis cannot be obtained. As shown in FIG. 14, it is configured so as to determine the operation for reproduction by adding a flag for indicating the deciphered state to a program information index, and describing in the flag as to whether the cryptanalysis is already performed or not.

Alternatively, it may be so configured that a CAT is inserted to the packet stream recorded in the record and reproduction unit 4, taking into consideration the event that a recording medium of the record and reproduction unit 4 is a portable medium. Specifically, a CAT is generated so as to indicate the encrypted state by the information table generator 7, and the CAT is then inserted to a packet stream by the information table insertion unit 3a.

Thus, even when a CAT is the processing object, it is able to configure so that an information table containing the CAT is made into a program information index, and then recorded in the system.

With the digital broadcast receiving system in accordance with the sixth preferred embodiment, the system can be operated by minimizing the quantity of the data to be recorded in a recording medium, except for the data of the program to be recorded. In the actual digital broadcast, the data other than the program broadcasted is present in an amount of 5 to 10% in the data transmitted. Accordingly, the configuration and operation of the digital broadcast receiving system in the sixth preferred embodiment enables to increase the occupancy rate of the broadcasting program data itself in a recording medium.

Seventh Preferred Embodiment

In the sixth preferred embodiment, of the information contained in the PAT and PMT, the value of a program_number and the PID value of each ES are described as they are, in a program information index. When the information data transmitted is initially received, these values are the information necessary for connecting to the reproduction operation. However, once these values have been received, they are not particularly required for the succeeding reproduction of the recorded program. Therefore, it is able to configure so as to manipulate the PID value described in a program information index, with respect to the PAT and PMT related to the program to be recorded.

The configuration of the digital broadcast receiving system of the seventh preferred embodiment is the same as that of the sixth preferred embodiment shown in FIG. 12. Operation of the system of the seventh preferred embodiment will be explained by showing differences from that of the sixth preferred embodiment.

Also in the seventh preferred embodiment, a packet filter 2 filters the unnecessary packets, as in the sixth preferred embodiment. The seventh preferred embodiment has the feature that a specific first value is substituted for the PID value of a PMT described in a PAT and, in order to correspond to the substitution made in the PMT, the first value is substituted for the PID value of a PMT related to the program to be recorded. In addition, a specific second value is substituted for the PID value of a ES described in the PMT related to the program to be recorded and, in order to correspond to the substitution made in the PMT, the second value is substituted for the PID value of the ES related to the program to be recorded. Based on the information table after performing the above substitution made in the respective PID values, a CPU 8 generates a program information index and records it in the memory 13.

An information table generator 7 and information table insertion unit 3a receive an instruction from the CPU 8 and, in order to correspond to the description of the program information index, the second value is substituted for the PID value of the ES composting a packet stream. This processing enables to record the packet stream in which the PID value of a ES is known, in a record and reproduction unit 4.

FIG. 15 is a diagram illustrating a program array information generated based on an information table when it is outputted from a receive and demodulation section 1.

FIG. 16 is a diagram illustrating a program information index generated based on the information table after performing the substitution of the respective PID values. In the program array information shown in FIG. 15, the moving picture and voice related to Program 2 have different PID values, depending on the recording position. On the other hand, in the program information index shown in FIG. 16, the moving picture and voice related to Program 2 have the same PID value, irrespective of the recording position.

In reproducing the recorded program, the PID value of the ES to be read from a recording medium is a known value which is described in the program information index. Therefore, a demultiplexer 10 and AV decoder 11 can directly start the processing of the ES, without verifying the description contents of a PAT and a PMT.

Alternatively, the PID value of each ES that is newly generated in the program recording can be processed so as to have the same value for each medium such as a video and an audio. FIG. 17 is a diagram illustrating a program information index generated in this processing. FIG. 18 is a diagram illustrating a system defining value. The program information index shown in FIG. 17, does not describe a program_number, and any one of the PID value of moving picture, voice, and PCR. By performing this processing, the program recording does not require the operation of describing the PID value of each ES in a program information index. Also, the program reproduction does not require the operation of verifying the description contents of a program information index, prior to the processing of each ES, because this operation is executable by using the system defining value as a program.

In the CPU 8, the position in the recording medium that records programs can be recognized for each program. Therefore, even when a plurality of programs are recorded at the same time, the PID value of each ES can be made the same in the record and reproduction unit 4. Even for packets having the same PID value, the CPU 8 can issue an appropriate instruction by recognizing the program based on its recording position in the record and reproduction unit 4.

For convenience of the user, the data of a descriptor portion in an information table can also be added to a program information index. For instance, the information on the program contents, broadcast format and receiving standard is described at the descriptor portion in a PMT. Such information can also be added to a program information index, and recorded in a recording region within the system, such as the memory 13. Once such information has been described in the program information index, it can be referred to when the recorded program is searched or watched in the future. In the program information index shown in FIG. 17, parental rate descriptors are described so as to correspond to the program. According to the description of Program 2, it is recommended to be watched and listened by those who are 13-year old or over. Convenience in selection can be improved by displaying such information when the user selects the program to be reproduced.

Thus, with the digital broadcast receiving system of the seventh preferred embodiment, the following advantage is obtainable in addition to the effect resulting from the system of the sixth preferred embodiment. That is, there is no need to verify the description contents of a program array information table, which is required in the program reproduction in the conventional system, thereby permitting fast processing of information data. Furthermore, it is able to provide a detailed program information to the user when reproducing the recorded program, thus leading to an improvement in the user's convenience.

Eighth Preferred Embodiment

The sixth preferred embodiment can also be so configured that the information contained in SI tables (particularly, SDT and EIT) is also described in a program information index.

The configuration of the digital broadcast receiving system of an eighth preferred embodiment is the same as that of the sixth preferred embodiment shown in FIG. 12. Operation of the system of the eighth preferred embodiment will be explained by showing differences from that of the sixth preferred embodiment.

The digital broadcast signal received and demodulated in a receive and demodulation section 1 is inputted to an information table extractor 6. In the extractor 6, a SI table is analyzed based on the instruction from a CPU 8, and the necessary data in its contents is inputted to the CPU 8. The information table extractor 6 gives attention to a self-stream and the present program related information, with respect to an SDT and EIT, and processes only the packet having the corresponding table ID. Of the present program related information, only the data related to the information indicated by the CPU 8 (e.g., the program name) is extracted by the information table extractor 6. The extracted information is associated with the program data recorded in a recording medium housed in a record and reproduction unit 4, and is then described in the program information index stored in the memory 13.

FIG. 19 is a diagram illustrating a program information index that is generated in the foregoing way. In the program information index shown in FIG. 19, there are described the channel name extracted from an SDT, and the detailed information on the program name and its broadcast day and time extracted from an EIT. When the user selects the program to be reproduced, by displaying the program related information on the monitor 12 by using the graphics section 15, this information can serve as an aid to select the program.

The SDT and EIT might contain the descriptors related to the program contents, broadcast format and receiving standard, as stated earlier. However, upon receiving a broadcast program, if it is judged that the broadcast can be watched and listened, and recorded, the reuse of its descriptors is not essential. Therefore, the packet transmitting an SDT and an EIT is subjected to filtering in the packet filter 2, thereby enabling to effectively utilize the recording region of the record and reproduction unit 4. Other recording and reproduction operations are the same as the sixth preferred embodiment.

Thus, in accordance with the digital broadcast receiving system of the eighth preferred embodiment, the following effect is obtainable in addition to the effect resulting from the system of the sixth preferred embodiment. That is, the user-friendly system can be configured through the processing of the data, such as SDT and EIT, inherent in digital broadcast signals.

Ninth Preferred Embodiment

To the sixth preferred embodiment, it is able to add such a configuration as to process SI tables other than an SDT and an EIT. A ninth preferred embodiment aims to increase the user's convenience by configuring the system while giving attention to a BAT. The BAT is an information table for collectively handling a plurality of services which are transmitted via multiple information transmission paths including other networks. The BAT is expected to be utilized in a variety of uses, such as future extension. For instance, when the user designates the program recording, by verifying the contents of a BAT in an information data to be transmitted, and describing its contents in a program information index, the user will be able to enjoy service using such a bouquet information.

The configuration of the digital broadcast receiving system of the ninth preferred embodiment is the same as that of the sixth preferred embodiment shown in FIG. 12. Operation of the system of the ninth preferred embodiment will be explained by showing differences from that of the sixth preferred embodiment.

A CPU 8 controls an information table extractor 6, to verify the arrival of a BAT and its description contents. The information on other information data is described in the descriptors of the BAT. Of these descriptors, the CPU 8 extracts a bouquet name, and a network identifier and a transport identifier, for transmitting various information data and describes them in a program information index stored in the memory 13. In the succeeding reproduction, the program information index so generated is referred to and, at that time, if other program information data composing the same bouquet can be utilized via a receive and demodulation section 1, it is able to provide the service to the user, according to the instruction of the CPU 8, in the reproduction system from a demultiplexer 10 and afterward.

Alternatively, the following configuration is possible. Specifically, when the user designates the program recording, if other program information data composing the same bouquet can be utilized via the receive and demodulation section 1, the mentioned other program information data can be recorded in the record and reproduction unit 4, together with the designated program information data, based on the user's instruction or a changeable setting information in the system. This automatic recording, of course, involves suitable operation of various information tables and the accompanying data substitution, as previously described, in order to increase the efficiency of recording by deleting the unnecessary data, and increase the processing speed during the reproduction.

Thus, in accordance with the digital broadcast receiving system of the ninth preferred embodiment, the following effect is obtainable in addition to the effect resulting from the system of the sixth preferred embodiment. That is, the user-friendly system can be configured through the processing of the data, such as BAT, inherent in digital broadcast signals.

Tenth Preferred Embodiment

In the first to ninth preferred embodiments, there are provided such a system configuration that the recorded information data is basically reused within the system. It is however able to so configure that the recorded information data is distributed to other external unit.

When the broadcast program recorded in a record and reproduction unit is reproduced in a closed form within the system, it is possible to give precedence to the efficiency of recording of a recording medium and employ a recording type of the highest efficiency. However, if considered the case where the recorded program information is utilized in a reproduction system other than the system with which the recording has been performed, it is necessary to output the program information in a format that conforms to ARIB or MPEG standard. The reason for this is that the units connected to the exterior are usually arbitrary ones, and these units do not have prior information about the recording and reproduction type and its operation inherent in the system of the invention. On the other hand, if the recording is performed by a general method that conforms to a given standard, by taking into consideration only the suitability to external units, it is impossible to perform such a high-efficiency recording as stated earlier. Hence, a tenth preferred embodiment provides a digital broadcast receiving system that can realize the suitability with external units, while maintaining a high efficiency of recording.

Figure 20:
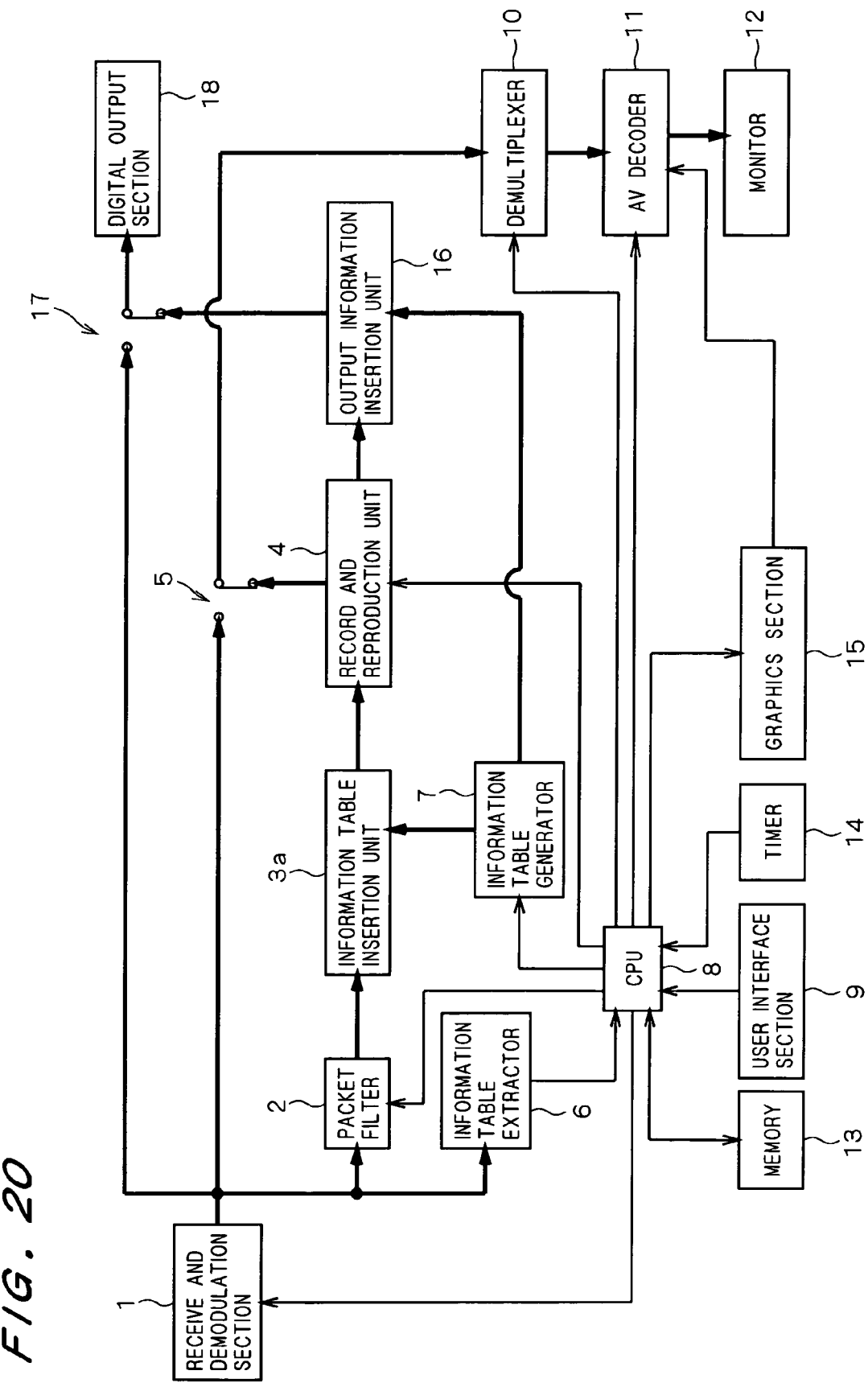
FIG. 20 is a block diagram illustrating the configuration of a digital broadcast receiving system according to a tenth preferred embodiment.

FIG. 20 is a block diagram illustrating the configuration of a digital broadcast receiving system according to the tenth preferred embodiment. As shown in FIG. 20, this system comprises adding, to the digital broadcast receiving system of the sixth preferred embodiment shown in FIG. 12, an output information insertion unit 16, circuit changing switch 17 and digital output section 18. The input of the output information insertion unit 16 is connected to the output of a record and reproduction unit 4 and the output of an information table generator 7, respectively. The output of the output information insertion unit 16 is connected to one input of the circuit changing switch 17. The other input of the circuit changing switch 17 is connected to the output of the receive and demodulation section 1, and the output of the switch 17 is connected to the digital output section 18.

The switching operation by the circuit changing switch 17 can be performed independently from, alternatively, in synchronization with, the switching operation by a circuit changing switch 5. Thereby, the digital output section 18, and the output to be displayed via a demultiplexer 10 and AV decoder 11 on a monitor 12, can be freely switched between the signal from the receive and demodulation section 1 and the signal from the record and reproduction unit 4. That is, it is able to output the same program or other program from the digital output section 18 to the exterior, while watching and listening a certain program on the monitor 12.

Operation of the digital broadcast receiving system according to the tenth preferred embodiment will mainly be explained as to the reproduction of the recorded program. The operation not explained in the following, such as the recording of programs, is the same as that in the foregoing preferred embodiments. A CPU 8 receives an instruction of a broadcast program reproduction from the user, through a graphics section 15 and user interface section 9. The CPU 8 then reads the data of the program to be reproduced, from a record and reproduction unit 4, by using the data of the recording position of the program which has been recorded in memory 13 or a recording medium housed in the record and reproduction unit 4. The read data is inputted to a circuit changing switch 5 and output information insertion unit 16, respectively. At this time, the CPU 8 also outputs an instruction of information table generation to an information table generator 7.

Now, an information table insertion to be effected by the information table generator 7 and output information insertion unit 16 will be explained hereinafter. As stated earlier, the digital broadcast signals recorded in the record and reproduction unit 4 contain a plurality of information tables having different frequency, kind and quantity. Hereat, a concrete explanation is made by assuming the case where no information table is contained in the digital broadcast signal recorded in the record and reproduction unit 4.

In the digital broadcast receiving system of the tenth preferred embodiment, the program data recorded in the record and reproduction unit 4 is converted to a packet stream that conforms to MPEG standard, and then outputted to an external unit. In recording the program of which reproduction is already instructed, the PID value of the packets for transmitting the program data is already recorded in memory 13 or a recording medium housed in the record and reproduction unit 4. In another embodiment, the PID value of these packets is converted to a system defining value. In either case, this PID value is, of course, known by the CPU 8. Based on this value, the information table generator 7 newly generates a PAT and a PMT to be inserted to the program data outputted from the record and reproduction unit 4. At this time, the configuration of FIG. 5 or FIG. 10 is employed to describe a variety of program related information which have been recorded. In the case where the receive and demodulation section 1 has the function of deciphering encryption, and the information on a CAT is not recorded in the memory 13 when recording the program, the information table generator 7 newly generates a CAT indicating that all the data is not encrypted. The generated CAT is inserted to the program data outputted from the record and reproduction unit 4, by the output information insertion unit 16. Thereby, the program data outputted from the output information insertion unit 16 has a PSI table and takes the form of a packet stream that conforms to MPEG standard. Therefore, even when such a program data is outputted via the circuit changing switch 17 and digital output section 18 to an arbitrary external unit, the external unit can perform analysis and decoding, based on the inputted packet stream.

In the PSI table insertion by the output information insertion unit 16, it is able to control its insertion timing. As previously described, the maximum allowable transmission intervals is specified for each PSI table, and thus it is required to repetitively transmit within the transmission intervals. For this, the CPU 8 measures and monitors the transmission intervals by using a timer 14 (or a timer housed in the CPU 8). When a certain table is inserted by the output information insertion unit 16, the CPU 8 stores the value of the timer and calculates the next insertion time of the table. The CPU 8 chronologically monitors the value indicated by the timer 14 and, before the maximum allowable transmission intervals of the table is elapsed, issues an instruction to the information table generator 17 and output information insertion unit 16, thereby multiplexing the next table. In this manner, it is able to obtain the packet stream in which each PSI table is multiplexed at the transmission intervals that conforms to MPEG standard.

In addition to the above-mentioned operation, the digital broadcast receiving system of the tenth preferred embodiment also controls the transmission rate of the packet stream outputted. An AV decoder 11 shown in FIG. 20 has a function of judging the data rate of the moving picture and voice data. In the usual TV signals, one frame is 33 msec cycle. If the image data read from the record and reproduction unit 4 is transmitted at a rate higher than that cycle, and it is judged that the capacity of a data buffer (not shown) of the AV decoder 11 is exceeded, the AV decoder 11 sends an instruction to the CPU 8, for a temporal halt of the output of the data from the record and reproduction unit 4. When the decoding processing of the moving picture and voice data is proceeded as time is elapsed, and the residual capacity of the data buffer becomes sufficient, the AV decoder 11 sends an instruction again to the CPU 8 when the data to be reproduced is required for the next frame, thereby resuming the data reading from the record and reproduction unit 4.

However, if the operation of the external unit connected to the digital output section 18 is proceeded on the assumption that it is controlled at an appropriate data rate on the sending side, as is the case with the ordinary packet stream, it might be impossible to directly use the digital information which has been recorded without containing no unnecessary packets, as mentioned in the foregoing embodiments. The reason for this seems to be that an AV decoder of the external unit cannot perform the mentioned data rate control, alternatively, the AV decoder does not have the function of sending an instruction of data rate control to the CPU 8 in the present system. In this event, it is necessary to output a packet stream having an appropriate data rate.

This operation is performed in the following manner that, according to the instruction from the CPU 8, a null packet is inserted to the packet stream outputted from the record and reproduction unit 4 by using the output information insertion unit 16. The null packet is one in which the PID value of a packet has a fixed value of "0x1FFF," and the data contained therein to be transmitted is insignificant. When a null packet is received by the system for receiving digital information data, the system is basically in the non-operation. In order to suitable set the data rate of a digital data outputted from the digital output section 18, the information table generator 7 generates a null packet, and the output information insertion unit 16 multiplexes the generated null packet with a packet stream.

In reproducing the recorded program, the CPU 8 verifies the PID value of the packet for transmitting a PCR, and verifies the PCR value in the data read from the record and reproduction unit 4, based on the recorded information table. At the same time, the CPU 8 starts to measure and monitor the reproduction time by using a timer 14 (or a timer housed in the CPU 8), when the reproduction is started. Since the PCR value is the value for describing a relative time at which the packet is to be transmitted, it shows the time initially transmitted and recorded. Thus, the packet stream having a suitable data rate can be generated by outputting a program data so as to keep constant the difference between the PCR value and the transmission time obtained by the timer 14. Specifically, the data rate can be controlled in the following configuration that the PCR value and the value indicated by the timer 14 are monitored by the CPU 8 and, as required, a null packet is multiplexed. With this configuration, even when an external unit which can handle only the usual digital broadcast signals that conform to MPEG standard is connected to the digital output section 18, the present system permits stable and versatile reproduction of digital broadcast programs without reducing the efficiency of recording of the record and reproduction unit 4.

In the foregoing explanation, the CAT is generated and multiplexed on the assumption that a program data is recorded after deciphering the encryption. Alternatively, in order to cope with the case where the recorded data recorded in the record and reproduction unit 4 is still encrypted, or the authentication of CA is not yet performed when the initial program is already transmitted, it is able to perform the output corresponding to the initial encrypted state.

For this, the information table generator 7 performs the following operations. When the receive and demodulation section 1 receives a digital broadcast signal, the CPU 8 chronologically describes the information of a CAT in the program information index stored in the memory 13 (or a recording medium housed in the record and reproduction unit 4). For instance, as shown in FIG. 14, the program information index retains the record as to whether the program is encrypted or not at that time (i.e., CA-system_id). When the program data is outputted from the digital output section 18, the CPU 8 refers to this description in the program information index, and directs the information table generator 7 and output information insertion unit 16, in order that the CAT to be multiplexed with a packet stream at each information output time, suitably reflects its encrypted state. Consequently, at the time of outputting the encrypted data, the CAT holds the description that the data is encrypted, and a packet stream to be outputted to an external unit conforms to MPEG standard, and it has such a form satisfying the operation as a CA system.

In FIG. 20, it is configured so that the output from the record and reproduction unit 4 is transmitted via the output information insertion unit 16 and circuit changing switch 17 to the digital output section 18, and also transmitted via the circuit changing switch 5 to the reproduction system from the demultiplexer 10 and afterward. Alternatively, it may be configured so that the output of the output information insertion unit 16 is transmitted to the reproduction system from the demultiplexer 10 and afterward. In this case, this reproduction system can be configured so as to handle only the usual digital signals that conform to MPEG standard, thus leading to a simpler software.

Also, the foregoing explanation is given of the output operation from the record and reproduction unit 4 to the digital output section 18. It is, of course, possible to perform the above-mentioned operation by transmitting the digital broadcast data from the record and reproduction unit 4 via the circuit changing switch 5 to the signal processing system consisting of the demultiplexer 10, AV decoder 11 and monitor 12.

In addition, the recording operation to the record and reproduction unit 4 can be operated at the same time the output operation is made to the digital output section 18 and/or the output operation is made to the demultiplexer 10, in the following construction that the CPU 8 controls the information table generator 7 to allow for the operation of the information table insertion unit 3a.

Thus, in accordance with the digital broadcast receiving system of the tenth preferred embodiment, the following effect is obtainable in addition to the effect resulting from any one of the foregoing preferred embodiments. That is, the digital data, which contains a program related information, etc. and conforms to MPEG standard, can be outputted to an arbitrary external unit.

Eleventh Preferred Embodiment

The configuration of a digital broadcast receiving system according to an eleventh preferred embodiment is the same as that of the tenth preferred embodiment shown in FIG. 20.

In the tenth preferred embodiment, the value of the program_number of each program is obtained as a value recorded in memory 13, or as a system defining value. As explained in the second or seventh preferred embodiment, when a plurality of programs are outputted at the same time in a digital broadcast receiving system in which a predetermined value is substituted for all the value of a program_number and the PID value of each ES, and then recorded, it is necessary to manipulate so that the value of the program_number of each program and the PID value of each ES are not the same. In this event, a desired operation is executable in the following manner that, for example, a different value is substituted for the program_number value and the PID value of each ES in one program, so as to be coincide with that of the other program.

As a concrete means, it is suggested, irrespective of the program_number value of the program data recorded in a recording medium, to alter the program_number value of the program data after it is read from a record and reproduction unit 4 and before outputted from a digital output section 18. That is, firstly a CPU 8 determines the program_number value to be newly added, and inputs its value to an information table generator 7. Based on the inputted value, the information table generator 7 newly generates a PAT and a PMT. If the program data recorded in the recording medium already has a PAT and a PMT, a newly generated table is substituted for these tables by the output information insertion unit 16. On the other hand, if the program data does not have any PAT and PMT, the newly generated PAT and PMT are inserted by the output information insertion unit 16. This enables to configure a digital broadcast receiving system which can give an arbitrary value of the program-number depending on the state of the system, to output a program data.

In addition to, alternatively, independently of this, the following configuration is achievable. Although in the above configuration, the operation is executed based on the PID value of each ES recorded in the memory 13 or the like. It is, however, able to configure so that any different value is substituted for the PID value of each ES by using the information table generator 7 and output information insertion unit 16. Also in this operation, a PSI table having the description that a plurality of programs are to be multiplexed and transmitted is newly generated by the information table generator 11, and then multiplexed with a program data by the output information insertion unit 16.

In the operation with this configuration, the following controls should be performed. Specifically, the CPU 8 controls the operation of the information table generator 7 and output information insertion unit 16, in order that the transmission intervals of each PSI table is suitably adjusted and multiplexed with a program data, and the CPU 8 compares the PCR value of an output data with the time measured by a timer 14, to control the insertion of a null packet by the output information insertion unit 16, in order that the program data is outputted at a data rate suitable for an external unit.

As to the generation and multiplexing of a PMT, it is able to configure so as to improve the user's convenience in selection, by utilizing the data related to the recorded program that is stored in memory 13, or a recording medium housed in the record and reproduction unit 4. Specifically, the system is configured so that the information table generator 7 generates a PMT containing various descriptors. If a parental rate descriptor is taken as example, the program information index recorded in the memory 13 or the like, contains the information on the program rating, as shown in FIG. 17. In the example shown in FIG. 17, no limitation is imposed on Program 1, whereas Program 2 is recommended to be watched and listened by 13-year old or over. In outputting such a program of which watching and listening is limited depending on the age, the user's convenience can be improved if this limitation is suitably effected on the receiver that is connected via the digital output section 18 to the exterior. For this, the information table generator 7 generates a PMT so as to contain descriptors, and the PMT is multiplexed with a program data by the output information insertion unit 16. Although the foregoing explanation is made of a parental rate descriptor, in the same operation, any multiplexing is executable independently of, alternatively, in combination with other descriptor. Thereby, a variety of program related information, etc. which have been recorded in the present system, can be provided even to the user employing an external unit.

Thus, in accordance with the digital broadcast receiving system of the eleventh preferred embodiment, there is the following effect in addition to the effect resulting from any one of the foregoing preferred embodiments. Specifically, it is able to configure such a system that can output a digital information which contains a variety of program related information and conforms to MPEG standard to the external unit, thereby increasing the user's convenience.

Twelfth Preferred Embodiment

To the tenth preferred embodiment, it is able to add such a configuration that SI tables are also processed. As stated earlier, the SI table contains various kinds of information on the program currently in transmission. In the output operation of a recorded program which is one of the functions of a digital broadcast receiving system of the present invention, particularly, in the output operation to an external unit, by performing a simultaneous output of the information contained in the SI table, it is able to configure such a system with which the user can make a selection between the reproduction of the recorded program and the watching and listening of the program currently in broadcast.

This operation will be explained by referring to FIG. 20. The SI table received by a receive and demodulation section 1 is extracted by an information table extractor 6. The SI table remains unchanged, alternatively, its table identification value is altered, according to the instruction from a CPU 8. Thereafter, the SI table is newly generated again by an information table generator 7. An output information insertion unit 16 multiplexes the new SI table with the program data outputted from a record and reproduction unit 4. The resulting program data is transmitted via a circuit changing switch 17 to a digital output section 18, and then outputted to an external unit. With this configuration, an external digital broadcast receiving system connected to the digital output section 18 can receive a SI table currently in transmission, together with the program data related to the past recorded program to be outputted from the record and reproduction unit 4. Since the SI table contains the information on the program currently in transmission, through a self-network or other network, the user employing the external digital broadcast receiving system can obtain the information on other broadcast program currently in transmission, even when the recorded program is currently in reproduction.

In addition to the above configuration, it is able to so configured that, of the SI tables, an SDT and an EIT are further subjected to the following processing. The information of the program is described in the SDT and EIT, respectively. These program related information are used for generating and processing a EPG in a general digital broadcast receiving system. The EPG is often essential in selecting the program to be received by the user and in receiving operation of the unit itself. Therefore, when the program data recorded in the record and reproduction unit 4 is outputted via the digital output section 18 to an external unit, the external unit can perform the receiving operation in the following manner that these program related information are multiplexed with the program data and then outputted.

This operation will be explained by referring to FIG. 20. EIT is a table for connecting the program_number of a broadcasting program and the information of the program such as the program name. When the program data recorded in the record and reproduction unit 4 is outputted via the digital output section 18 to an external unit, the addition of an EIT to the program data allows the user employing the external unit to select the reproduced program and obtain its information.

Thus, in the EIT there are a total of six tables of: the present and the next programs; programs within eight days; and programs from the eighth day on, which are related to a self-stream and other stream, respectively. In reproducing the program recorded in the record and reproduction unit 4, only the EIT of the present program of the self-stream has significance. The EIT of other stream can be inserted to a program data in the following manner that according to the instruction of the CPU 8, the EIT obtained in the information table extracted 6 is newly generated in the information table generator 7, and then multiplexed in the output information insertion unit 16. During this operation, the EITs related to the transmitted self-stream and other stream are all regarded by the external unit, as an EIT related to other stream. It is therefore necessary that the table identification value indicating the EIT related to other stream is substituted for the table identification value indicating the EIT related to the self-stream, and then multiplexed with the program data.

In generating an EIT, the information table generator 7 refers to a variety of program related information contained in the program information index stored in memory 13 or the like. As shown in FIG. 19, detailed information such as the program name, broadcast day and time, and its contents, is described in the program information index. By adding a further detailed information to the program information index, it is able to improve the user's convenience in the program selection. With the external broadcast receiving system that has received the program data thus generated and outputted, not only the present program of the self-stream from the EIT can be obtained to watch and listen the program currently in reproduction, but also the program currently in transmission in other stream or the information on a program scheduled for broadcast in the future can be obtained. It is also able to watch and listen the program currently in transmission by stopping watchig and listening of the recorded program transmitted from the record and reproduction unit 4 as required, and switching via the receive and demodulation section 1 to a live broadcast information.

In addition to, alternatively, independently of this, it is possible to configure so as to handle an SDT as a processing object. SDT is a table for connecting the service identification of a broadcasting program with its program_number. Therefore, when the program data stored in the record and reproduction unit 4 is outputted via the digital output section 18 to an external unit, the addition of an SDT to its program data allows the user employing the external unit to select the reproduced program and obtain its information.

Thus, in the SDT there are a total of two tables which are related to a self-stream and other stream. In reproducing the program recorded in the record and reproduction unit 4, only the SDT related to the self-stream has significance. The SDT related to other stream can be inserted to a program data in the following manner that according to the instruction of the CPU 8, the SDT obtained in the information table extracted 6 is newly generated in the information table generator 7 and then multiplexed in the output information insertion unit 16. During this operation, the SDTs related to the transmitted self-stream and other stream are all regarded by the external unit, as the SDT of other stream. It is therefore necessary that the table identification value (0x46) indicating the SDT related to other stream is substituted for the table identification value indicating the SDT related to the self-stream, and then multiplexed with the program data.

In generating an SDT, the information table generator 7 refers to a variety of program related information described in the program information index stored in the memory 13 or the like. As shown in FIG. 19, the service information indicated by a broadcast channel is described in the program information index. By outputting this service information and the like from the digital output section 18, together with the program data, it is able to improve the user's convenience in the program selection. According to ARIB standard, it is specified that the program_number of the program reproduced is to be the same as the service_id in an SDT. It is therefore necessary that in generating an SDT, the program_number of the recorded program data is read from the program data or program information index, in order to use as the service_id in the SDT.

With the external broadcast receiving system that has received the program data thus generated and outputted, not only the service information of the self-stream can be obtained from the SDT, to watch and listen the program currently in reproduction, but also the information on the program currently in transmission in other stream or a program scheduled for broadcast in the future can be obtained. It is also able to watch and listen the program currently in transmission by stopping watching and listening of the recorded program transmitted from the record and reproduction unit 4 as required, and switching via the receive and demodulation section 1 to a live broadcast information.

For these operation, there are used the value of the information on the reproduced program data, such as program_number. Therefore, it is of course necessary to operate so as to have a data value that suitably conforms to a given standard, when performing an information table insertion and data substitution which are related to the actual reproduction.

Thus, by generating an EIT and an SDT in the information table generator 7, and inserting them to a program data in the output information insertion unit 16, the EIT and SDT which are currently in transmission, can be transmitted together with the program data of the recorded program, to an external unit. Thereby, the selection and watching and listening of the reproduced program, which is outputted from a digital information receiving system of the present invention, can be performed in an external digital broadcast receiving system by utilizing only the EPG and the user interface inherent in this system, without any special prior information.

Figure 21:
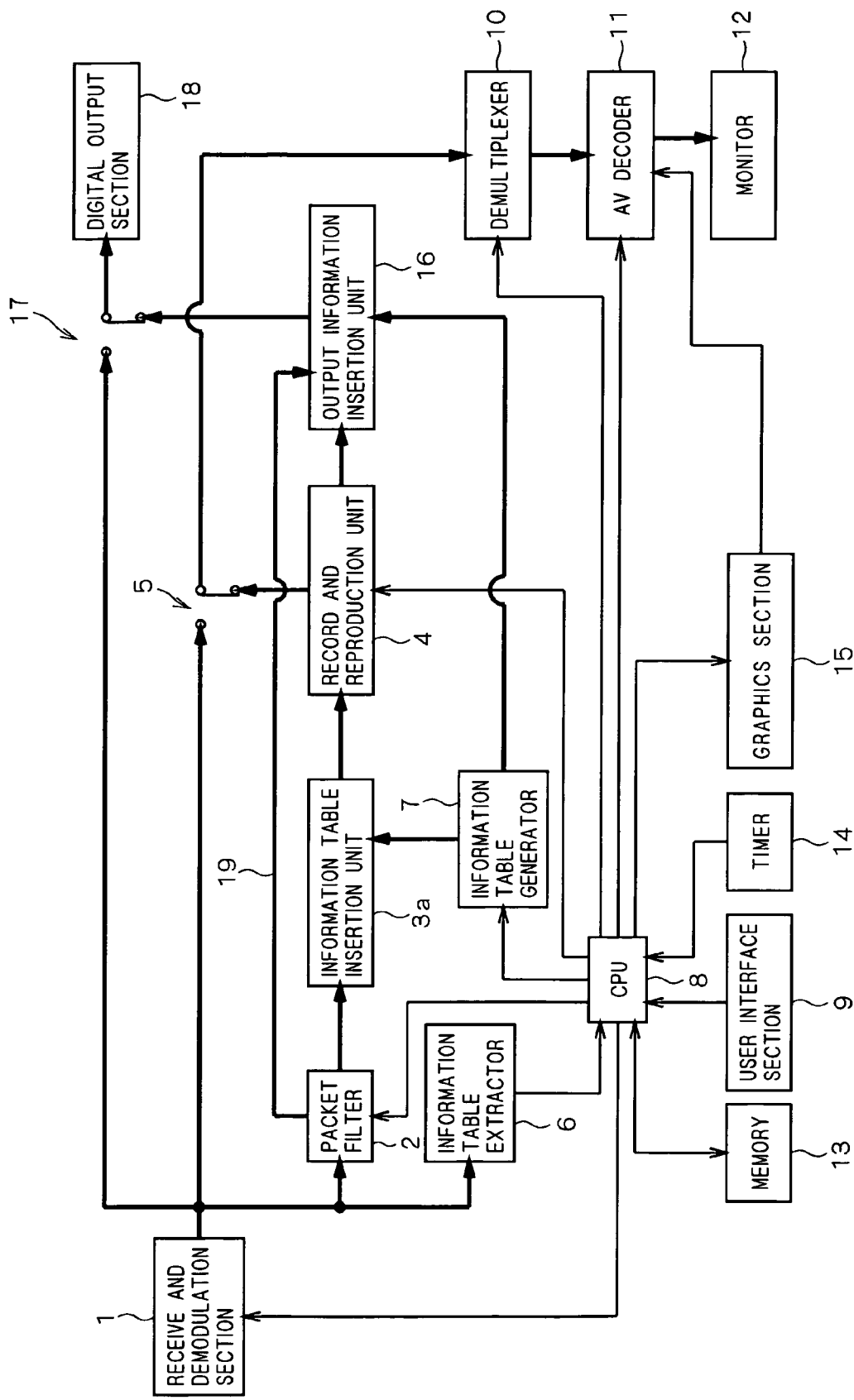
FIG. 21 is a block diagram illustrating the configuration of a digital broadcast receiving system according to a twelfth preferred embodiment.
Figure 22:
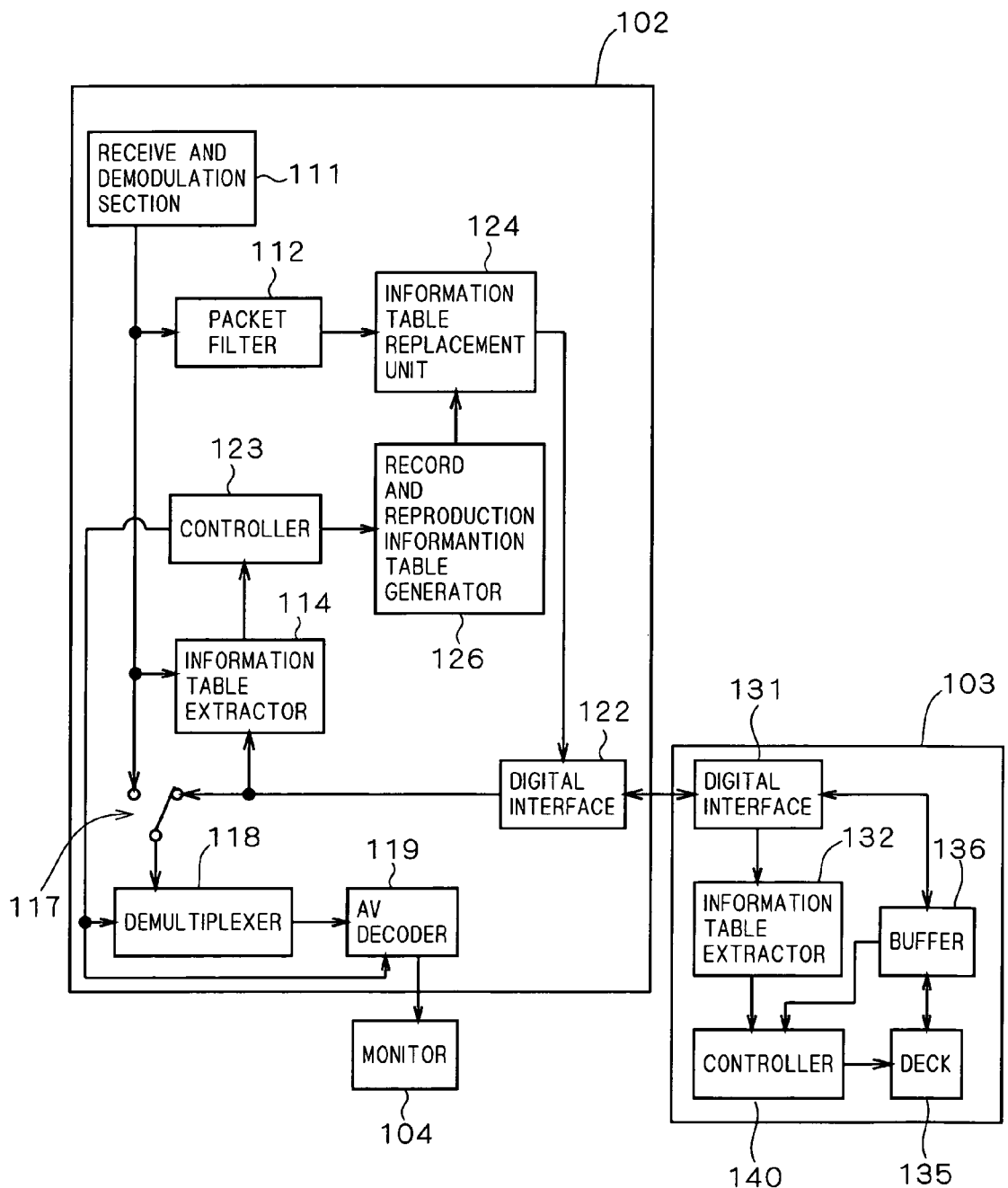
FIG. 22 is a block diagram illustrating the configuration of a conventional digital broadcast receiving system.

It is also able to configure so as to handle a BAT and a PCAT as a processing object. FIG. 21 is a block diagram illustrating the configuration of other digital broadcast receiving system according to the twelfth preferred embodiment. As shown in FIG. 21, this digital broadcast receiving system comprises adding, to the system as shown in FIG. 20, a signal line 19 for connecting a packet filter 2 and an output information insertion unit 16. Operation of this system will be explained by referring to FIG. 21. BAT contains the information on the data of a plurality of program services, and PCAT contains the information on the data of program services such as image, voice and program. There are, for example, one which is useful only in the real time during the broadcast, and one which is usable over a prolonged time. In particular, the PCAT contains the information on the data of the difference from various data transmitted in the past, and it is considered that in some cases, the data of the difference has also significance even in reproducing the program data recorded in the past.

When the program data recorded in the record and reproduction unit 4 is outputted via the digital output section 18 to an external unit, the BAT currently in transmission is extracted by the information data extractor 6, and the CPU 8 judges whether there is a relationship between various services currently in transmission and the program to be reproduced.

If it is judged there is no relationship, the BAT currently in transmission is inputted, as it is, from the packet filter 2 via the signal line 19 to the output information insertion unit 16. In the unit 16, the BAT is multiplexed with the program data and then outputted. On the other hand, if it is judged there is a relationship, it is operated so that all the information services described in the BAT are outputted from the digital output section 18, according to a rule (which differs depending on the specification) set by an external digital broadcast receiving system, alternatively, a digital broadcast receiving system according to the present invention. In this operation, the CPU 8 temporarily records the BAT currently in transmission in the record and reproduction unit 4, and immediately reads it from the unit 4 and then sends it to the output information insertion unit 16. In this operation, the information table generator 7 operates so as to retain the consistency between all the information services described in the BAT and the program data outputted from the record and reproduction unit 4. The CPU 8 controls the transmission intervals of the BAT by using the timer 14, in order to retain the transmission intervals that conforms to MPEG standard and ARIB standard.

When reproducing a recorded program as described, an information table extractor 6 extracts the PCAT currently in transmission, and the CPU 8 judges whether there is a relationship between the various services currently in transmission and the program to be reproduced. Based on the description in the PCAT, if it is judged that the difference data currently in transmission is not related to the program data currently in reproduction, the PCAT is newly generated as it is, by the information table generator 7, and then multiplexed with the program data by the output information insertion unit 16. On the other hand, based on the description in the PCAT, if it is judged that the difference data is related to the program data, the difference data is transmitted via the packet filter 2 to the output information insertion unit 16. In this operation, the information table generator 7 operates so as to retain the consistency between all the difference data described in the PCAT and the program data outputted from the record and reproduction unit 4. The CPU 8 controls the transmission intervals of the PCAT by using the timer 14, in order to retain the transmission intervals that conforms to MPEG standard and ARIB standard.

Furthermore, the SI information on the time of the program currently in transmission and its broadcast circumstances can be handled as a processing object. This operation will be explained by referring to FIG. 21. TDT and TOT function in pairs to indicate the information of the present time, and these are often used together with EIT and SDT, in displaying a EPG and performing the operation in a general digital broadcast receiving system. When the program data recorded in the record and reproduction unit 4 is outputted via the digital output section 18 to an external unit, the packet filter 2 selects TDT and TOT which are currently in transmission, and then transmits them via the signal line 19 to the output information insertion unit 16, according to the instruction from the CPU 8. The output information insertion unit 16 multiplexes the TDT and TOT with the program data read from the record and reproduction unit 4. The resulting program data is transmitted via the circuit changing switch 17 and digital output section 18 to an external unit. The user employing the external unit can select a program and watching and listening the program, by referring to the EPG generated based on the TDT and TOT.

Thus, in reproducing a recorded program, the information on the broadcast time (the record time) of this program is described in an EIT, thereby contributing to the user's selection of the program watching and listening. When the digital broadcast receiving system connected to the exterior judges broadcast circumstances based on the broadcast time information described in the EIT, and on the present time information described in a TDT and a TOT, this system obtains only the information saying that the reproduced program was broadcasted in a different past time.

In general, a RST is set so as to respond to a sudden alternation in the program organization, and it can designate a new broadcast start time and the present broadcast circumstances, to descriptors such as network, transport, and program. The RST also designates the broadcast circumstances of the program described in an EIT and, depending on the configuration of a receiving system, it can specify the operation of the system, in preference to the description in the EIT and SDT.

In this case, according to the instruction of the CPU 8, the information table generator 7 generates a RST, and the output information insertion unit 16 multiplexes the RST with the reproduced program. Although the EIT describes that the reproduced program is not currently in transmission, the digital broadcast receiving system connected to the exterior can be aware of the transmission of the reproduced program, by referring to the RST. This means that by referring to a EPG, the user employing the external digital broadcast receiving system can select the watching and listening of the reproduced program, as regarded it as one currently in transmission, though it is the past broadcast program.

Thus, in accordance with the digital broadcast receiving system of the twelfth preferred embodiment, there is the following effect in addition to the effect resulting from any one of the foregoing preferred embodiments. Specifically, by the addition of SI table as a processing object, it is able to output a digital information that conforms to the MPEG standard and contains a variety of program related information, to an external unit, thereby enabling to configure such a system that can improve the user's convenience.

While the invention has been shown and described in detail, the foregoing description is in all aspects illustrative and not restrictive. It is therefore understood that numerous modifications and variations can be devised without departing from the scope of the invention.

What is claimed is:

1. A digital broadcast receiving system comprising:
 a receive and demodulation section by which a digital broadcast signal received from the exterior is demodulated and outputted as a packet stream;
 a packet filter that filters a predetermined packet in a plurality of packets composing said packet stream;
 a record and reproduction unit by which said packet stream passing through said packet filter is recorded, and said recorded packet stream is reproduced and outputted;
 an information table generator for generating a predetermined information table;
 an output information insertion unit by which said predetermined information table is inserted to said packet stream outputted from said record and reproduction unit, thereby to output it as a new packet stream; and
 a circuit changing switch that performs a selective switching between said packet stream outputted from said receive and demodulation section, and said new packet stream outputted from said output information insertion unit, thereby performing its transmission to a digital output section wherein,
 said packet stream recorded in said record and reproduction unit does not conform to a predetermined standard, and said new packet stream is made to conform to said predetermined standard by inserting said predetermined information table, wherein, said information table generator has a function with which the PID value of an ES to be described is subjected to an arbitrary alteration, to generate said predetermined information table; and said output information insertion unit has a function with which the value obtained by said alteration to said PID value is substituted for the PID value of a packet transmitting an ES contained in said packet stream transmitted wherein, said information table generator has a function with which the value of a program number of a program recorded in said record and reproduction unit is subjected to an arbitrary alteration, to generate said predetermined information table; and said output information insertion unit has a function with which the value obtained by said alteration to said program number is provided to said packet stream transmitted.

2. The digital broadcast receiving system according to claim 1, wherein when said new packet stream is transmitted from said output information insertion unit via said circuit changing switch to said digital output section, at least one of an SDT, EIT, BAT, PCAT (Partial Content Announcement Table), TDT (Time Data Table) and TOT (Time Offset Table) is multiplexed with said new packet stream, and then outputted.

* * * * *